(12) United States Patent
Iwakura et al.

(10) Patent No.: US 10,218,893 B2
(45) Date of Patent: Feb. 26, 2019

(54) IMAGE CAPTURING SYSTEM FOR SHAPE MEASUREMENT OF STRUCTURE, METHOD OF CAPTURING IMAGE OF STRUCTURE FOR SHAPE MEASUREMENT OF STRUCTURE, ON-BOARD CONTROL DEVICE, REMOTE CONTROL DEVICE, PROGRAM, AND STORAGE MEDIUM

(71) Applicant: Mitsubishi Electric Corporation, Chiyoda-ku (JP)

(72) Inventors: Takashi Iwakura, Chiyoda-ku (JP); Takayuki Ishida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/760,276

(22) PCT Filed: Oct. 11, 2016

(86) PCT No.: PCT/JP2016/080099
§ 371 (c)(1),
(2) Date: Mar. 15, 2018

(87) PCT Pub. No.: WO2017/073310
PCT Pub. Date: May 4, 2017

(65) Prior Publication Data
US 2018/0262674 A1 Sep. 13, 2018

(30) Foreign Application Priority Data
Oct. 27, 2015 (JP) .................. 2015-210973

(51) Int. Cl.
*H04N 5/232* (2006.01)
*B64D 47/08* (2006.01)
(Continued)

(52) U.S. Cl.
CPC ......... *H04N 5/23203* (2013.01); *B64C 13/20* (2013.01); *B64C 39/02* (2013.01);
(Continued)

(58) Field of Classification Search
CPC ....... B64C 39/024; B64D 47/08; G01B 11/24; G05D 1/0044; H04N 5/23203; H04N 5/23225
See application file for complete search history.

(56) References Cited

U.S. PATENT DOCUMENTS 8,953,933 B2 2/2015 Ohtomo et al.
9,007,461 B2 4/2015 Ohtomo et al.
(Continued)

FOREIGN PATENT DOCUMENTS

JP 2003-130674 A 5/2003
JP 2005-269413 A 9/2005
(Continued)

OTHER PUBLICATIONS

Office Action dated May 16, 2017 in Japanese application No. 2017-514733 (with English translation).
(Continued)

*Primary Examiner* — Thomas G Black
*Assistant Examiner* — Ce Li Li
(74) *Attorney, Agent, or Firm* — Oblon, McClelland, Maier & Neustadt, L.L.P.

(57) ABSTRACT

An image capturing system for shape measurement includes: an image capturing device configured to capture an image of a structure; an air vehicle; an on-board control device configured to control the image capturing device and the air vehicle in accordance with an image capturing scenario; and a remote control device configured to create an image capturing scenario and transfer the created image capturing scenario to the on-board control device. The air vehicle (Continued)

autonomously flies to image capturing points sequentially so as to capture images. The captured data is transmitted to the remote control device via a wireless LAN.

9 Claims, 16 Drawing Sheets

(51) Int. Cl.
| | |
|---|---|
| B64C 39/02 | (2006.01) |
| G05D 1/00 | (2006.01) |
| G01B 11/24 | (2006.01) |
| B64C 13/20 | (2006.01) |
| B64D 17/00 | (2006.01) |
| G01C 11/06 | (2006.01) |
| H04N 5/222 | (2006.01) |
| H04N 5/225 | (2006.01) |

(52) U.S. Cl.
CPC ............ *B64C 39/024* (2013.01); *B64D 17/00* (2013.01); *B64D 47/08* (2013.01); *G01B 11/24* (2013.01); *G01C 11/06* (2013.01); *G05D 1/0044* (2013.01); *H04N 5/222* (2013.01); *H04N 5/225* (2013.01); *H04N 5/23225* (2013.01); *B64C 2201/123* (2013.01); *B64C 2201/146* (2013.01)

(56) References Cited

U.S. PATENT DOCUMENTS

| | | | |
|---|---|---|---|
| 2010/0100269 | A1 | 4/2010 | Ekhaguere et al. |
| 2013/0076862 | A1 | 3/2013 | Ohtomo et al. |
| 2014/0210663 | A1 | 7/2014 | Metzler |
| 2016/0001893 | A1 | 1/2016 | Wang |
| 2016/0075447 | A1 | 3/2016 | Wang |
| 2018/0189705 | A1* | 7/2018 | Nonaka .................... G06T 7/97 |
| 2018/0218534 | A1* | 8/2018 | Sato ........................ G06T 17/05 |
| 2018/0273173 | A1* | 9/2018 | Moura ................. G05D 1/0094 |

FOREIGN PATENT DOCUMENTS

| | | |
|---|---|---|
| JP | 2006-27448 A | 2/2006 |
| JP | 2006-82774 A | 3/2006 |
| JP | 2010-095246 A | 4/2010 |
| JP | 2013-108927 A | 6/2013 |
| JP | 2014-089160 A | 5/2014 |
| WO | 2015/127630 A1 | 9/2015 |

OTHER PUBLICATIONS

Office Action dated Jul. 11, 2017 in Japanese application No. 2017-514733 (with English translation).
International Search Report dated Dec. 27, 2016 in PCT/JP2016/080099, filed on Oct. 11, 2016.

\* cited by examiner

IMAGE CAPTURING SYSTEM FOR SHAPE MEASUREMENT OF STRUCTURE, METHOD OF CAPTURING IMAGE OF STRUCTURE FOR SHAPE MEASUREMENT OF STRUCTURE, ON-BOARD CONTROL DEVICE, REMOTE CONTROL DEVICE, PROGRAM, AND STORAGE MEDIUM

TECHNICAL FIELD

The present disclosure relates to a system for capturing an image of a structure for shape measurement of the structure using an image capturing device mounted on an air vehicle.

BACKGROUND ART

In recent years, there have been proposed various systems for measuring geographical features or the like using image capturing devices mounted on mainly remotely controlled air vehicles, such as a drone, a multicopter, and an UAV (Unmanned Air Vehicle). On the other hand, in a photographic measurement system, an air vehicle used therein is controlled by human being or is guidance-controlled based on GPS (Global Positioning System). Geographical feature and aerial photographic measurements are performed in the following manner: the air vehicle is guided to image capturing points and captures images at the plurality of image capturing points, and then all the captured images are combined. In such a photographic measurement system, an image capturing device is fixed to the air vehicle by an actuator or the like. For the aerial photographic measurements, it has been proposed to use a helicopter configured to autonomously fly without remote control (for example, Japanese Patent Laying-Open No. 2013-108927: Patent Document 1).

CITATION LIST

Patent Document

PTD 1: Japanese Patent Laying-Open No. 2013-108927
PTD 2: Japanese Patent Laying-Open No. 2014-89160

SUMMARY OF INVENTION

Technical Problem

For a large-sized structure, precision in shape has been conventionally measured using photogrammetry. The photogrammetry is a photographic measurement in which size and shape of a three-dimensional object is determined by analyzing parallax information from captured two-dimensional images of the three-dimensional object at a plurality of observation points. In recent years, the photogrammetry has been used for a three-dimensional shape measurement device employing a digital camera.

In the conventional method, for measurement of the large-sized structure (for example, a high-precision parabolic antenna or the like), a plurality of (about 150 to 200) images need to be captured from above the structure at different locations using a vehicle for high lift work. Accordingly, the vehicle for high lift work needs to be moved repeatedly and the image capturing needs to be performed repeatedly. As a result, a plurality of operators are required for the driving operation of the vehicle for high lift work and the image capturing operation at a workbench. This requires time and effort. The measurement using an unmanned air vehicle as in Japanese Patent Laying-Open No. 2013-108927 is mainly used for measurement of geographical features, and is not sufficiently considered to be applied to measurement of a structure. Meanwhile, Japanese Patent Laying-Open No. 2014-89160 (Patent Document 2) discloses a ground device configured to create a flight plan for an air vehicle, as well as the air vehicle configured to fly in accordance with the flight plan to capture images. However, an influence of the large-sized structure on the flight course is not taken into consideration in the flight plan in terms of avoiding the air vehicle from meeting the target structure or in terms of maintaining a determined distance from the large-sized structure during the image capturing. As with the measurement of geographical features and the like, it is desired to use an air vehicle to capture a photograph for measurement of precision in shape of the large-sized structure.

It is an object of the present disclosure to provide an image capturing system for shape measurement of a structure to efficiently capture an image for the shape measurement of the structure, as well as a method of capturing an image of a structure for shape measurement of the structure.

Solution to Problem

An image capturing system for shape measurement of a structure according to the present disclosure includes: an image capturing device configured to capture an image of the structure; an air vehicle; an on-board control device mounted on the air vehicle; and a remote control device. The air vehicle has the image capturing device mounted thereon, and is configured to fly and be unmoved in air.

The on-board control device includes: an image capturing scenario storage configured to store an image capturing scenario that includes an image capturing point and a flight route including the image capturing point, the image capturing point being a point at which the air vehicle is located when capturing the image of the structure; an image capturing controller configured to control the image capturing device in accordance with the image capturing scenario; and a flight controller configured to control the air vehicle in accordance with the image capturing scenario.

The remote control device includes: a scenario creator configured to create the image capturing scenario based on the image capturing point; and a scenario transferer configured to transfer the image capturing scenario created by the scenario creator to the on-board control device so as to store the image capturing scenario in the image capturing scenario storage.

Advantageous Effects of Invention

According to the present disclosure, an image used for shape measurement of a structure can be captured in a short time efficiently in accordance with a predetermined image capturing scenario.

DESCRIPTION OF EMBODIMENTS

Figure 1:
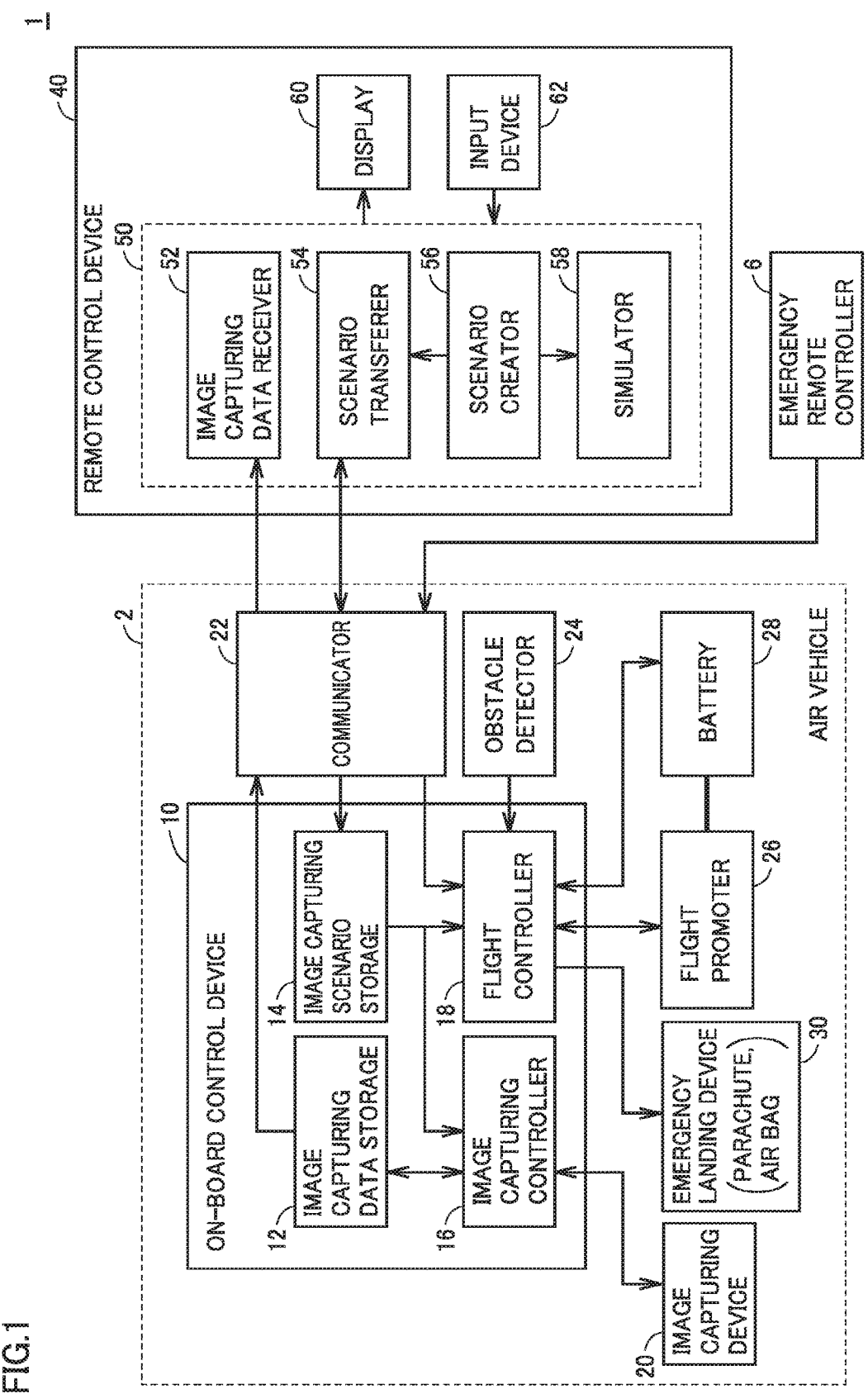
FIG. 1 is a block diagram showing a configuration of an image capturing system for shape measurement of a structure according to a first embodiment of the present disclosure.

The following describes embodiments of the present disclosure in detail with reference to figures. A plurality of embodiments will be described below; however, it has been expected at the time of filing of the present application to appropriately combine configurations described in the respective embodiments. It should be noted that the same or corresponding portions in the figures are given the same reference characters and are not described repeatedly.

First Embodiment

FIG. 1 is a block diagram showing a configuration of an image capturing system for shape measurement of a structure according to a first embodiment of the present disclosure. An image capturing system 1 for shape measurement of a structure includes: an image capturing device 20 configured to capture an image of the structure; an air vehicle 2; an on-board control device 10 mounted on air vehicle 2; and a remote control device 40 configured to transfer data to on-board control device 10. Air vehicle 2 is a pilotless airplane having image capturing device 20 mounted thereon. Air vehicle 2 is configured to fly and be unmoved in air. Examples of air vehicle 2 usable herein include a drone, a multicopter, an UAV, and the like. Image capturing system 1 for the shape measurement further includes a communicator 22, an obstacle detector 24, a flight promoter 26, a battery 28, and an emergency landing device 30, which are mounted on air vehicle 2.

On-board control device 10 includes an image capturing scenario storage 14, an image capturing controller 16, and a flight controller 18. Image capturing scenario storage 14 is configured to store an image capturing scenario. Image capturing controller 16 is configured to control image capturing device 20 in accordance with the image capturing scenario. Flight controller 18 is configured to control air vehicle 2 in accordance with the image capturing scenario.

Remote control device 40 is a remote control device configured to remotely control air vehicle 2. Remote control device 40 includes a main processor 50, a display 60, and an input device 62. The main processor 50 includes a scenario creator 56, a simulator 58, a scenario transferer 54, and an image capturing data receiver 52.

Scenario creator 56 is configured to create an image capturing scenario based on an input from an operator. Scenario creator 56 is configured to: present, to the operator, shape information that is based on three-dimensional CAD (Computer-Aided design) information of the target structure; determine a plurality of image capturing points based on the input from the operator; and determine a flight route from a flight start point to a flight end point via a plurality of image capturing points. It should be noted that each of the image capturing points is a point at which the air vehicle is located when capturing an image of the structure. It should be noted that in the shape measurement using the photogrammetry, a distance from the target during the image capturing affects precision of measurement. Hence, during the image capturing, the distance between the air vehicle and the target, i.e., the structure needs to be maintained to be a certain distance (hereinafter, referred to as "image capturing distance") determined based on precision required for the shape measurement. Based on the input from the operator, scenario creator 56 is configured to determine a plurality of image capturing points separated from the structure by the image capturing distance. Scenario creator 56 is configured to create the image capturing scenario based on the determined image capturing points. Moreover, the operator inputs image capturing conditions for each of the image capturing points. The image capturing conditions include: the number of images to be captured at the image capturing point; an image capturing direction in each image capturing; an image capturing range; image capturing pixels; an aperture; a shutter speed; and the like. The image capturing scenario includes the image capturing points, the image capturing conditions, and the flight route including the image capturing points. The flight start point may be the same as or different from the flight end point. Scenario creator 56 is configured to create a flight route in which air vehicle 2 does not meet the structure. Scenario creator 56 is configured to check whether or not a path connecting a first image capturing point to a second image capturing point in a straight line meets the structure, the first image capturing point and the second image capturing point being different image capturing points. When the path does not meet the structure, scenario creator 56 is configured to create the flight route including the path connecting the first image capturing point to the second image capturing point in the straight line. On the other hand, when the path connecting the first image capturing point to the second image capturing point in the straight line meets the structure, scenario creator 56 is configured to create a flight route including a path avoiding the structure between the first image capturing point and the second image capturing point.

Simulator 58 is configured to check the image capturing scenario created by scenario creator 56 by performing a simulation of the image capturing scenario before performing the image capturing scenario in the air vehicle. Simulator 58 is configured to present, to the operator, presence/absence of an obstacle on the flight route, a flight time estimate value, and a battery remaining amount estimate value after the flight of the air vehicle on the flight route. It should be noted that simulator 58 may be configured to present, to the operator, at least one of the presence/absence of the obstacle on the flight route, the flight time estimate value, and the battery remaining amount estimate value after the flight of the air vehicle on the flight route.

Scenario transferer 54 is configured to transfer the image capturing scenario created by scenario creator 56 to on-board control device 10, and store the image capturing scenario in image capturing scenario storage 14.

Flight controller 18 is configured to control air vehicle 2 to achieve a determined image capturing distance between air vehicle 2 and the structure at the image capturing point. Flight controller 18 is configured to control air vehicle 2 in accordance with the image capturing scenario including the image capturing point separated from the structure by the determined image capturing distance, the image capturing scenario being created based on the shape information of the structure. It should be noted that air vehicle 2 may further include a distance measurer mounted on air vehicle 2 and configured to measure a distance between air vehicle 2 and the structure. In this case, based on a result of the measurement by the distance measurer, flight controller 18 is configured to control air vehicle 2 to achieve the determined image capturing distance between air vehicle 2 at the image capturing point and the structure. Obstacle detector 24 is mounted on air vehicle 2 and is configured to detect an obstacle around air vehicle 2. When obstacle detector 24 detects an obstacle on the flight route included in the flight scenario during the flight, flight controller 18 is configured to change the flight route to avoid the obstacle to reach the image capturing point.

It should be noted that image capturing system 1 for the shape measurement includes an emergency remote controller 6 that can be operated by the operator upon emergency or when required. When a remote control request is received from the operator, flight controller 18 is configured to control air vehicle 2 in accordance with the operator's remote control using emergency remote controller 6, rather than the image capturing scenario.

Figure 2:
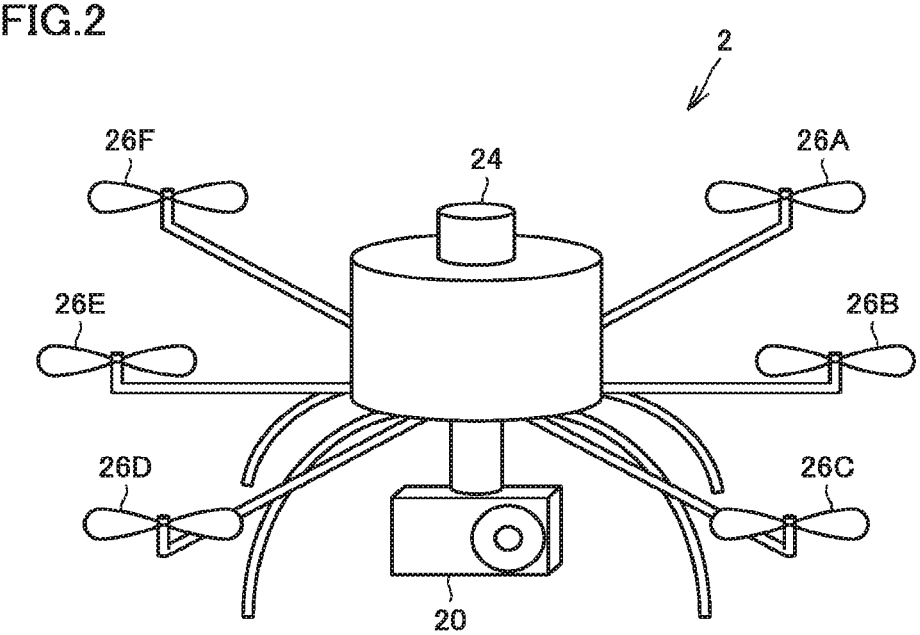
FIG. 2 shows an external appearance of the air vehicle used in the first embodiment.

FIG. 2 shows an external appearance of air vehicle 2. Air vehicle 2 includes: propellers 26A to 26F serving as flight promoter 26 of FIG. 1; obstacle detector 24; image capturing device 20; and a gimbal 9 that supports image capturing device 20. Examples of image capturing device 20 usable herein include a photogrammetry camera.

Obstacle detector 24 includes one or more of an infrared camera, a proximity sensor, an ultrasonic wave or laser sensor, and a geomagnetic sensor.

Gimbal 9 has a function of starting a calibration function of image capturing device 20 once for every 1 to 20 captured images. That is, gimbal 9 is configured to change angles to change the direction of image capturing device 20 to capture one or more images. The image capturing is performed in the following manner: image capturing device 20 is rotated at a plurality of different locations in the flight scenario and a determined ratio of images captured with image capturing device 20 being rotated are included with respect to all the captured images. For example, by performing the image capturing with image capturing device 20 being rotated by 90°, image capturing device 20 can be corrected.

It should be noted that necessity of the calibration and the calibration method differ depending on a photogrammetry system to be used. When the calibration is unnecessary, the calibration is not performed. When the calibration is performed by a different method, the gimbal, the air vehicle, the image capturing device, or the like has the calibration function depending on the method.

Figure 3:
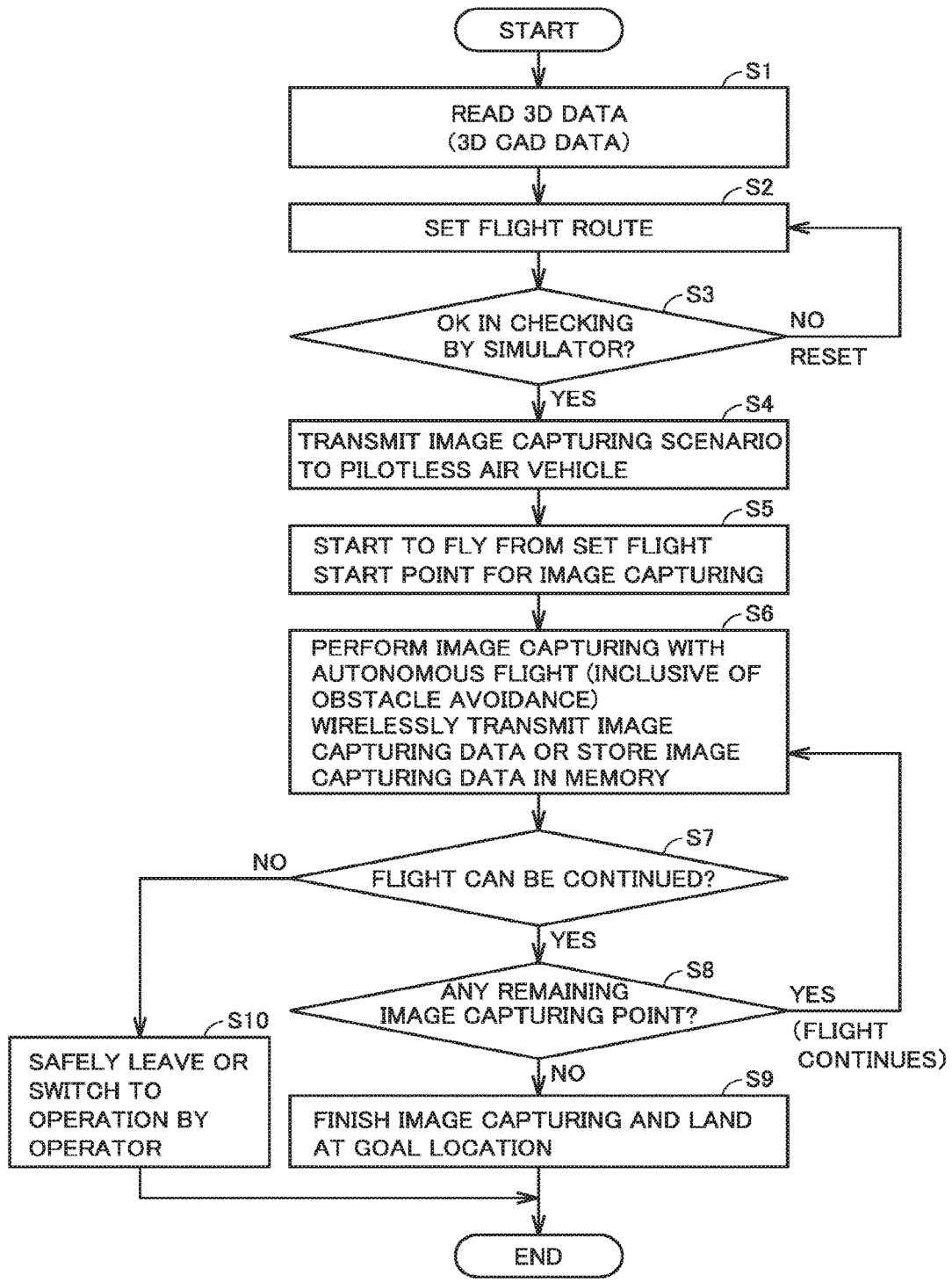
FIG. 3 is a flowchart showing a procedure of a method of capturing an image of the structure for the shape measurement of the structure in the first embodiment.

FIG. 3 is a flowchart showing a procedure of a method of capturing the image of the structure for the shape measurement of the structure in the present embodiment. This method is a method of capturing an image of a structure for shape measurement of the structure using an air vehicle 2 configured to fly and be unmoved in air, air vehicle 2 having an image capturing device and an on-board control device mounted thereon.

This method includes: a step (S2) of creating, based on an input from an operator, an image capturing scenario including an image capturing point, an image capturing condition, and a flight route including the image capturing point; a step (S4) of transferring the image capturing scenario to the on-board control device to store the image capturing scenario in the on-board control device; and steps (S5 to S9) of controlling the air vehicle to fly in accordance with the image capturing scenario, become unmoved in air at the image capturing point, and capture the image of the structure using the image capturing device.

First, in a step S1, 3D data (three-dimensional data) is read. The operator introduces a three-dimensional shape model of the target structure into remote control device 40 for flight route settings. Examples of the three-dimensional shape model include a 3D-CAD model prepared in advance before the flight of air vehicle 2 and the image capturing.

Then, in step S2, the operator sets a flight route of air vehicle 2.

Figure 4:
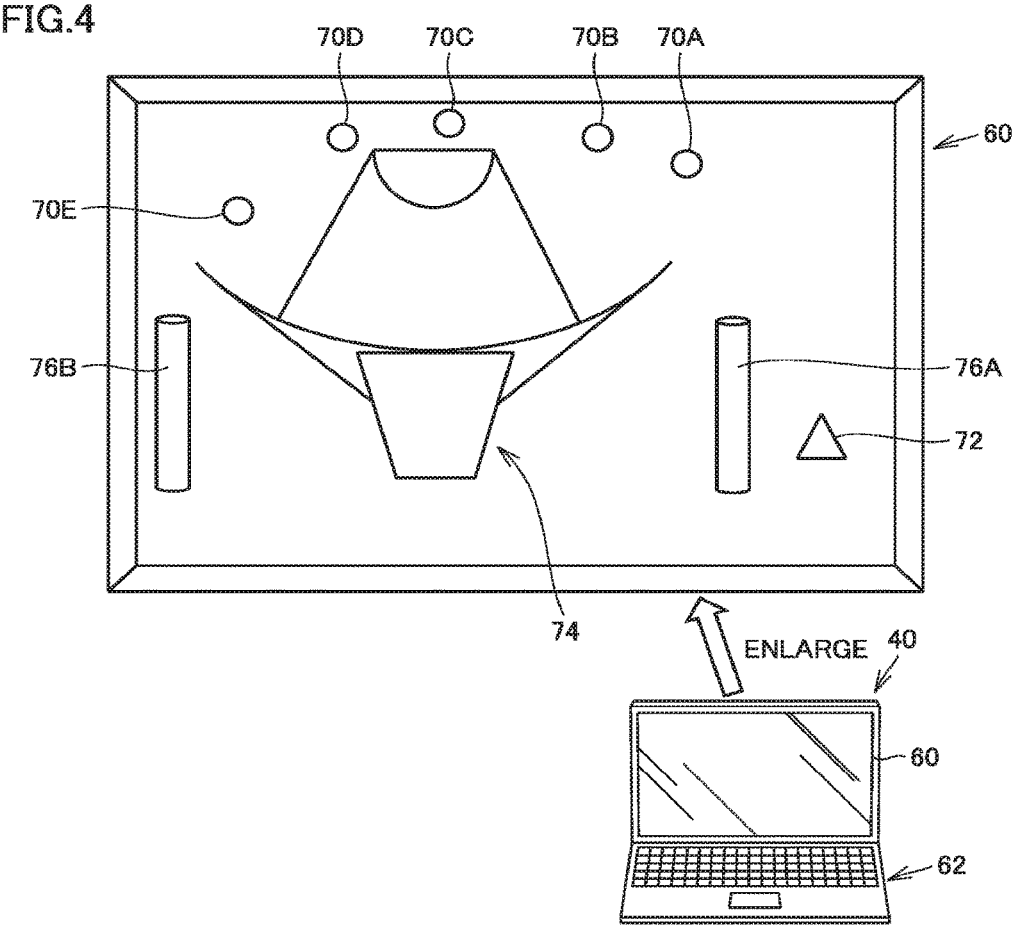
FIG. 4 illustrates a state in setting a flight route.

FIG. 4 illustrates a state in setting the flight route. The operator operates input device 62 to set image capturing points 70A to 70E and the flight route of air vehicle 2 while viewing the screen of display 60 of remote control device 40 presenting a structure data image 74, a flight start point 72, and reference objects 76A, 76B. Structure data image 74 is an image generated based on the 3D data of target structure 3 for design.

The flight route is basically set with the structure being unmoved at a reference location. Even in the case of a structure including a movable portion, the coordinates of the image capturing point or a positional relation between the structure and the image capturing point is only required to set the flight route as long as the structure is unmoved at the reference location. During the image capturing, the structure is unmoved in the same state as that in the 3D data used in setting the flight route. Therefore, operation information of the movable portion of the structure is not basically required. It should be noted that the expression "unmoved at a reference location" means a state in which the structure is directed upward as presented in the screen in FIG. 4 in the case where the structure is a parabolic antenna, for example.

After setting the flight route in step S2, in a step S3, the operator checks the flight route, the flight time, the battery remaining amount, and the like in advance by way of simulator 58 (route simulator) of FIG. 1. When necessary, the operator corrects the flight route again in step S2.

Figure 5:
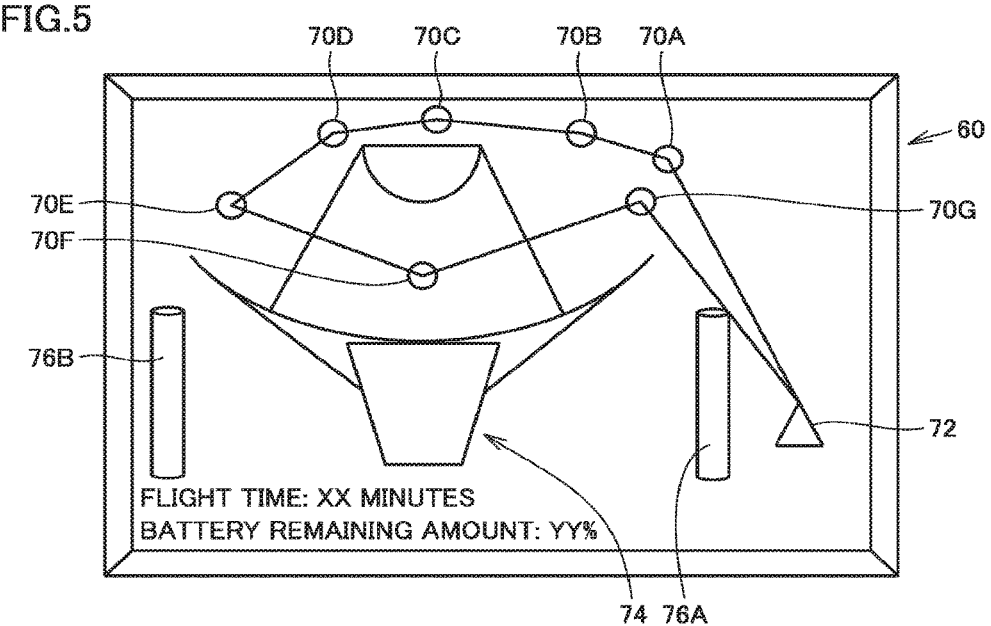
FIG. 5 illustrates a state in checking the flight route using a route simulator.

FIG. 5 illustrates a state in checking the flight route using the route simulator. Display 60 presents the flight route of air vehicle 2 flying from flight start point 72, reaching image capturing points 70A to 70G in this order, and returning to flight start point 72.

Before the flight, the operator can check whether or not there is a possibility that air vehicle 2 on the flight route will meet the structure. It should be noted that when there is a possibility that air vehicle 2 will approach to the structure by more than a certain distance determined in consideration of the sizes of the structure and air vehicle 2, simulator 58 may provide a notification to the operator.

In image capturing system 1 for the shape measurement, the flight route is set on the 3D model presented on display 60, whereby the operator can visually check the flight route.

Based on the flight distance derived from the set flight route and the number of images to be captured as well as known data such as power consumption, flight speed, and the like of air vehicle 2, simulator 58 calculates a flight time (XX minutes) and a remaining amount (YY %) of battery 28 after the flight, and presents them at the lower left portion of display 60. Accordingly, it is possible to avoid the image capturing from being aborted due to the battery being run out by capturing too many images or by the flight distance being too long, for example.

Here, the description is directed to FIG. 1 and FIG. 3 again. When it is found that there is a problem in the image capturing scenario as a result of the checking by the simulator (NO in step S3), the process is returned to step S2 and the operator is urged to reset the flight route. On the other hand, when there is no problem in the image capturing scenario as a result of the checking by the simulator (YES in step S3), the set image capturing scenario is transferred by wireless or wired communication to air vehicle 2 via communicator 22 in step S4. The transferred data may be the coordinates of the flight route or a relative positional relation between the structure and the flight route. On-board control device 10 converts the transferred coordinate data or positional relation data between the structure and the flight route into flight data. It should be noted that the conversion into the flight data may be performed by remote control device 40 (personal computer or the like); however, in that case, the flight data is transferred from remote control device 40 to on-board control device 10.

As communicator 22, air vehicle 2 includes a wireless LAN device for transmission and reception of the flight route and the image capturing data. In consideration of a case where the wireless LAN cannot be used, air vehicle 2 further includes a wired LAN jack. In consideration of a case where the image capturing data may be lost in the wireless transmission or the image capturing data may be unable to be transmitted wirelessly during the flight, air vehicle 2 has a function of saving the data to an image capturing data storage 12 (memory) and obtaining the data from image capturing data storage 12 after landing. It should be noted that the wireless LAN device may not be included therein.

Then, in step S5, air vehicle 2 starts to fly from set flight start point 72 to capture images of structure 3. Then in step S6, air vehicle 2 autonomously flies to the image capturing points sequentially, and automatically collects captured images without receiving instructions from the operator on-line.

Figure 6:
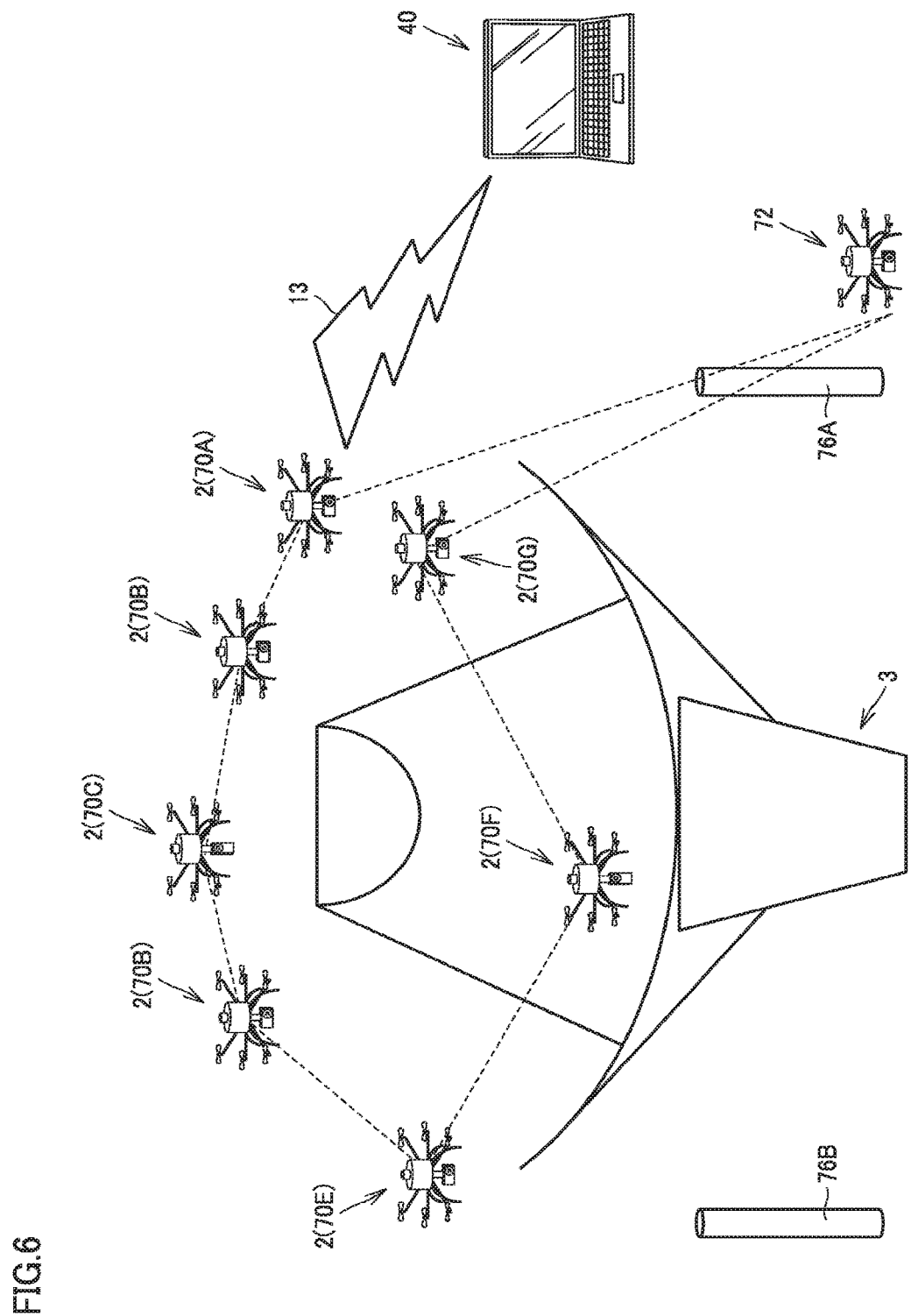
FIG. 6 shows a manner of performing the image capturing for the shape measurement using the air vehicle.

FIG. 6 shows a manner of performing the image capturing for the shape measurement using the air vehicle. Air vehicle 2 is set at flight start point 72 near target structure 3, and then starts to fly for image capturing. Air vehicle 2 autonomously flies to image capturing points 70A to 70G in this order, and becomes unmoved in air at each of the image capturing points to capture images. The calibration of image capturing device 20 is performed once for every 1 to 20 captured images during the image capturing. It should be noted that it is shown schematically that the direction of image capturing device 20 is changed at each of image capturing points 70C and 70F by the gimbal for the sake of calibration.

Air vehicle 2 flies from flight start point 72, reaches image capturing points 70A to 70G, and then returns to flight start point 72. Even if there is an unexpected obstacle on the flight route, obstacle detector 24 and flight controller 18 of FIG. 1 change the flight route to avoid the obstacle.

On-board control device 10 of air vehicle 2 checks the location of air vehicle 2 through one of or a combination of processes (1) to (5) below. It should be noted that in the case of (2) to (5), various sensors included in obstacle detector 24 are used to not only specify the location of the air vehicle but also detect an obstacle.

(1) In a GPS environment, the location of the air vehicle is checked based on a GPS signal.

(2) In a non-GPS environment, one or more reference points blinking or emitting light in three directions are provided at the structure itself or around the structure in advance using LED(s), laser(s), or the like. A vision sensor, an infrared camera, or the like is used to recognize a visible line resulting from reflection, by dust or the like, of the rays of light emitted in the three directions from the reference point(s). In accordance with a plurality of items of reference point information, image processing is performed, thereby checking the location of the air vehicle.

(3) A laser sensor is used to obtain point group data through three-dimensional scanning. Based on the obtained three-dimensional spatial location data, mapping is performed to estimate the location of the target structure and the location of the air vehicle.

(4) An infrared camera or a vision sensor is used to scan surroundings to estimate the location of the air vehicle through image processing based on visual information of the structure.

(5) When geomagnetic data can be obtained in advance, a geomagnetic sensor is used to estimate the location of the air vehicle based on the obtained geomagnetic data.

It should be noted that in the case of each of (1) to (5) above, an obstacle on the flight route is avoided in the following manner: a laser sensor, an ultrasonic sensor, or a proximity sensor is used to measure a distance from the obstacle, and the air vehicle is controlled to fly such that the distance from the obstacle does not become less than or equal to a predetermined distance. Flight controller 18 controls flight promoter 26 to autonomously fly on a route that allows the air vehicle to return to the previously set flight route while avoiding the obstacle.

It should be noted that FIG. 6 shows an example in which reference objects 76A, 76B provided with reference points for the process of (2) above are disposed.

Flight controller 18 controls flight promoter 26 to avoid the obstacle by performing 3D mapping using obstacle detector 24 during the flight and to return to the original flight route as much as possible. It should be noted that the "3D mapping" in the present specification means that the location of air vehicle 2 is specified by detecting an object around air vehicle 2 using the various sensors included in obstacle detector 24 (one of or a combination of the infrared camera, the proximity sensor, the ultrasonic sensor, the laser sensor, and the geomagnetic sensor).

In one example, the 3D mapping can be implemented by simultaneously creating a surrounding environment map and estimating the location of the air vehicle during the flight through a so-called SLAM (Simultaneous Localization and Mapping) technique.

An image capturing system for shape measurement of a structure using a conventional air vehicle needs to be in the GPS environment for guidance control by an operator or control based on GPS. In the case of a large-sized structure such as a high-precision parabolic antenna, the large-sized structure needs to be assembled indoors once during production in order to verify precision, and GPS may be unable to be used during image capturing. Moreover, images of the large-sized structure need to be captured also in a final installation state; however, the large-sized structure may be installed in a location that is not in the GPS environment. Therefore, it is desirable to fly and capture images even not in the GPS environment.

Moreover, the guidance control in the GPS environment allows for setting of an image capturing point and flight along a route; however, when there is an unexpected obstacle on the route, it is difficult to avoid the obstacle. In the conventional image capturing system for the shape measurement of the structure, flight and measurement outside the field of view of the operator or supervisor are not mentioned. Hence, it is considered difficult to fly and capture images outside the field of view of the operator or supervisor.

Image capturing system 1 for the shape measurement in the present embodiment allows for flight outside the field of view and at night in the non-GPS environment because the autonomous flight is performed while performing the 3D mapping. During the flight, no operation by the operator is required. Particularly, the large-sized target structure is likely to be affected by a temperature, and the measurement is desired to be performed during night time during which the temperature is relatively stable. Even during night time during which visual flight cannot be performed, autonomous flight can be performed by employing an infrared sensor, a laser sensor, a geomagnetic sensor, or the like for the sensor mounted on obstacle detector 24.

The image capturing data is transmitted to remote control device 40 via wireless LAN 13. When wireless LAN 13 cannot be used, the image capturing data is saved in an internal memory (image capturing data storage 12 of FIG. 1). When the transmission becomes possible, the image capturing data is transmitted thereto via wireless LAN 13. Alternatively, on-board control device 10 may be configured to permit the image capturing data to be extracted from the internal memory (image capturing data storage 12) to remote control device 40 via a wired LAN connection after completion of the image capturing.

The description is directed to FIG. 3 again. In step S6, when data collection at a certain image capturing point is finished, the process is brought to step S7 and it is determined whether or not air vehicle 2 can continue flying. For example, the autonomous flight may become unable to be continued due to an unexpected situation (occurrence of a blast of wind; failure of image capturing device 20, flight promoter 26, obstacle detector 24 or the like; battery 28 is run out; an obstacle cannot be avoided; and the like). In the event of occurrence of such an unexpected situation (NO in S7), the process is brought to step S10. In step S10, flight controller 18 controls flight promoter 26 to safely leave to a predetermined retreat point, or requests the operator to end the autonomous flight performed in accordance with the image capturing scenario and operate the air vehicle using emergency remote controller 6, and performs a process to switch to the operation by the operator. It should be noted that the switching to the operation by the operator is performed in the case where the autonomous flight cannot be performed but flight by remote control can be performed. Until the operator operates the air vehicle after performing the process to switch to the operation by the operator, air vehicle 2 is unmoved in air at the location.

On the other hand, when it is determined in step S7 that the flight can be continued (YES in S7), the process is brought to step S8. In step S8, it is determined whether or not the image capturing at all the image capturing points has been completed. When there is a remaining image capturing point (YES in S8), the process is returned to step S6, and the image capturing is performed at the remaining image capturing point. On the other hand, when there is no remaining image capturing point (NO in S8), the process is brought to step S9, and flight controller 18 controls air vehicle 2 to land at a goal location (flight start point 72) set in advance, thus ending the flight and image capturing process. It should be noted that after the completion of the flight and image capturing, the operator performs data processing of the collected captured images in remote control device 40 through photogrammetry, thereby measuring the shape of target structure 3 and checking precision of the shape thereof with respect to the design value thereof. The data processing of the captured images may be performed using a device different from remote control device 40.

As described above, the image capturing system for the shape measurement of the structure according to the first embodiment includes: scenario creator 56 configured to cause remote control device 40 for setting a flight route to designate a flight route with reference to a three-dimensional model such as 3D CAD data; and simulator 58 configured to check the flight route and flight time.

With such a configuration, the operator can readily set a flight route including an image capturing point for capturing an image of a large-sized structure. Moreover, by way of the simulator function, it can be checked in advance whether or not the flight route is appropriate. Further, the air vehicle for which the flight route has been set flies from a flight start point, performs image capturing, and then returns thereto. During this, no special instruction from the operator is required.

Hence, the image capturing time can be significantly reduced as compared with the image capturing using a vehicle for high lift work. Moreover, whether or not the set flight route is appropriate for the structure can be known in advance, and the pilotless plane can be avoided from colliding with the structure and can be avoided from falling due to the battery or fuel being run out. Further, by eliminating operations by human being during the flight of the air vehicle, the air vehicle can be avoided from colliding with the target structure due to a misoperation by the operator. Moreover, the location of the air vehicle can be checked by performing 3D mapping using various sensors during the flight, whereby the flight and image capturing can be performed more efficiently than those in the case where the air vehicle is operated by human being.

It should be noted that in the description above, communicator 22 is configured to transfer the scenario from remote control device 40 to air vehicle 2 and transfer the image capturing data from air vehicle 2 to remote control device 40. However, an image capturing data transmitter connected to a LAN may be also provided in image capturing device 20, the transfer of the scenario may be performed between the scenario transferer and the communicator, and the transfer of the image capturing data may be performed between the image capturing data transmitter and an image capturing data receiver.

Second Embodiment

In the first embodiment, it has been exemplified that one air vehicle 2 is used. In a second embodiment, respective flight routes are set in advance for two or more air vehicles based on 3D shape data. In videogrammetry in which images of a structure in a plurality of operating states are captured in order to measure a change in shape thereof in the operating states, image capturing points are substantially fixed when measuring the same structure. Hence, in the second embodiment, the number of image capturing points on a flight route for one air vehicle is also decreased.

Figure 7:
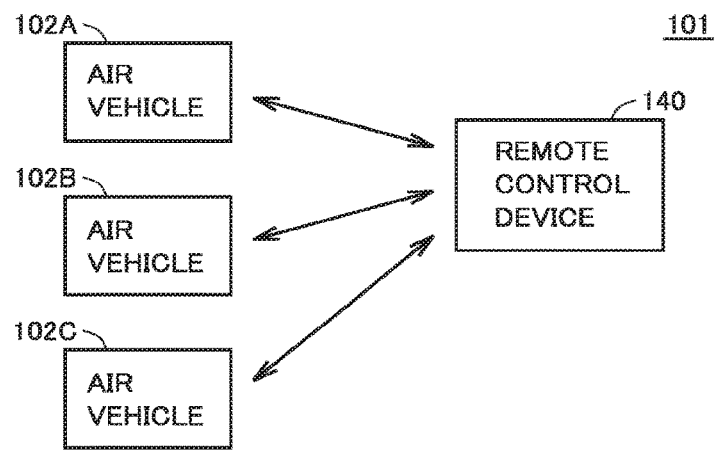
FIG. 7 is a block diagram showing a configuration of an image capturing system for shape measurement of a structure according to a second embodiment.

FIG. 7 is a block diagram showing a configuration of an image capturing system for shape measurement of a structure according to a second embodiment. An image capturing system 101 for shape measurement includes a remote control device 140 and a plurality of air vehicles 102A to 102C. Remote control device 140 has basically the same configuration as that of remote control device 40 shown in FIG. 1. Moreover, each of air vehicles 102A to 102C has basically the same configuration as that of air vehicle 2 shown in FIG. 1. Details of the respective configurations will be described with reference to FIG. 1.

Image capturing system 101 for the shape measurement includes: a plurality of air vehicles 102A to 102C each configured to fly and be unmoved in air; a plurality of image capturing devices 20; a plurality of on-board control devices 10; and a remote control device 140.

The plurality of image capturing devices 20 are configured to capture images of the target structure, and respective image capturing devices 20 are mounted on the plurality of air vehicles 102A to 102C. Respective on-board control devices 10 are mounted on the plurality of air vehicles 102A to 102C. Remote control device 140 is a remote control device configured to remotely control the plurality of air vehicles 102A to 102C. Remote control device 140 is configured to transfer respective data corresponding to the air vehicles to respective on-board control devices 10 mounted on the plurality of air vehicles 102A to 102C.

Each of the plurality of on-board control devices 10 includes: an image capturing scenario storage 14 configured to store an image capturing scenario including an image capturing point, an image capturing condition, and a flight route including the image capturing point; an image capturing controller 16 configured to control the image capturing device in accordance with the image capturing scenario; and a flight controller 18 configured to control the air vehicle in accordance with the image capturing scenario. Remote control device 140 includes: a scenario creator 56 configured to create the image capturing scenario for each of the plurality of air vehicles 102A to 102C based on an input from an operator; and a scenario transferer 54 configured to transfer the image capturing scenario created by scenario creator 56 to on-board control device 10 of the corresponding air vehicle so as to store the image capturing scenario in image capturing scenario storage 14. Based on the plurality of image capturing points, scenario creator 56 is configured to create divided scenarios, which are respective image capturing scenarios for air vehicles 102A to 102C. The plurality of image capturing points includes simultaneous image capturing points at which images are determined to be captured simultaneously. The respective simultaneous image capturing points are included in different divided scenarios. Scenario transferer 54 is configured to transfer the created divided scenario to on-board control device 10 of a corresponding air vehicle of the plurality of air vehicles 102A to 102C.

Figure 8:
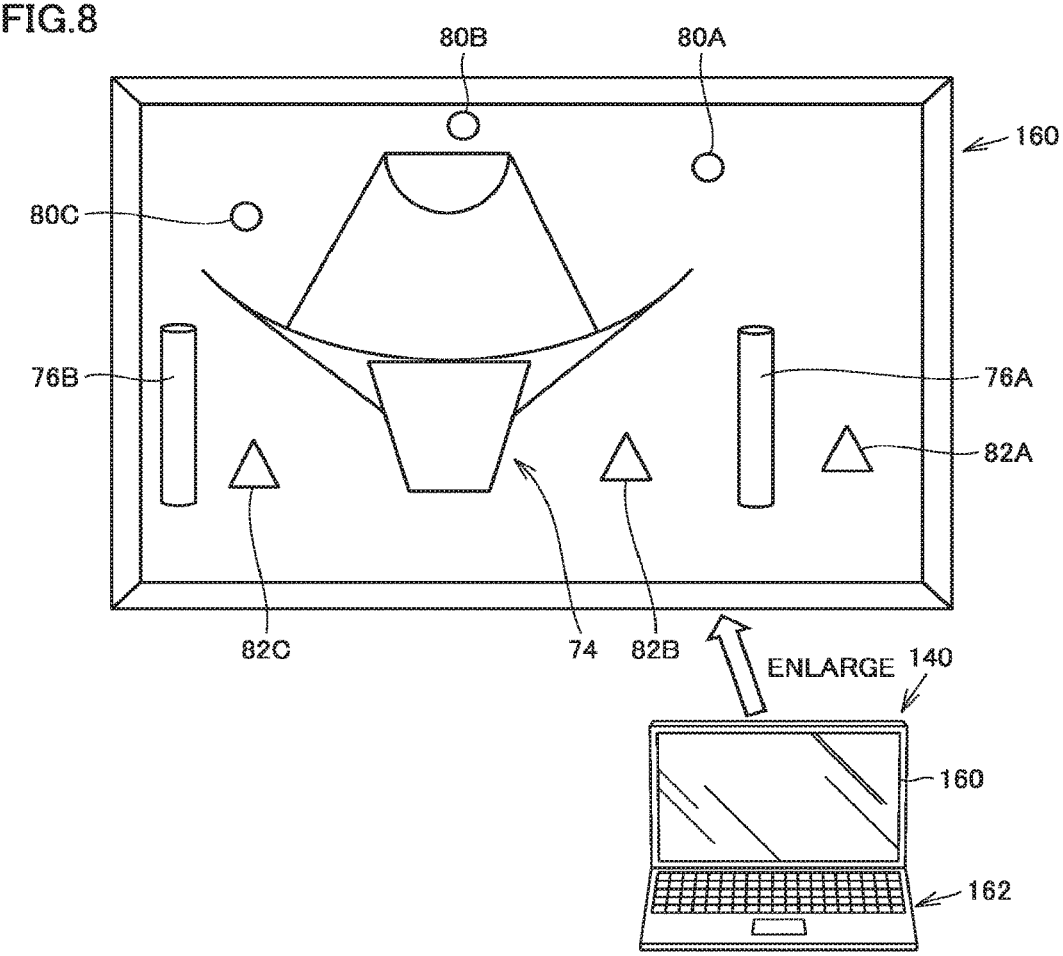
FIG. 8 illustrates a state in setting a flight route in the second embodiment.

FIG. 8 illustrates a state in setting the flight route in the second embodiment. The operator operates an input device 162 to set image capturing points 80A to 80C and the flight routes of air vehicles 102A to 102C while viewing the screen of a display 160 of remote control device 140 presenting a structure data image 74, flight start points 82A to 82C respectively corresponding to air vehicles 102A to 102C, and reference objects 76A, 76B.

Figure 9:
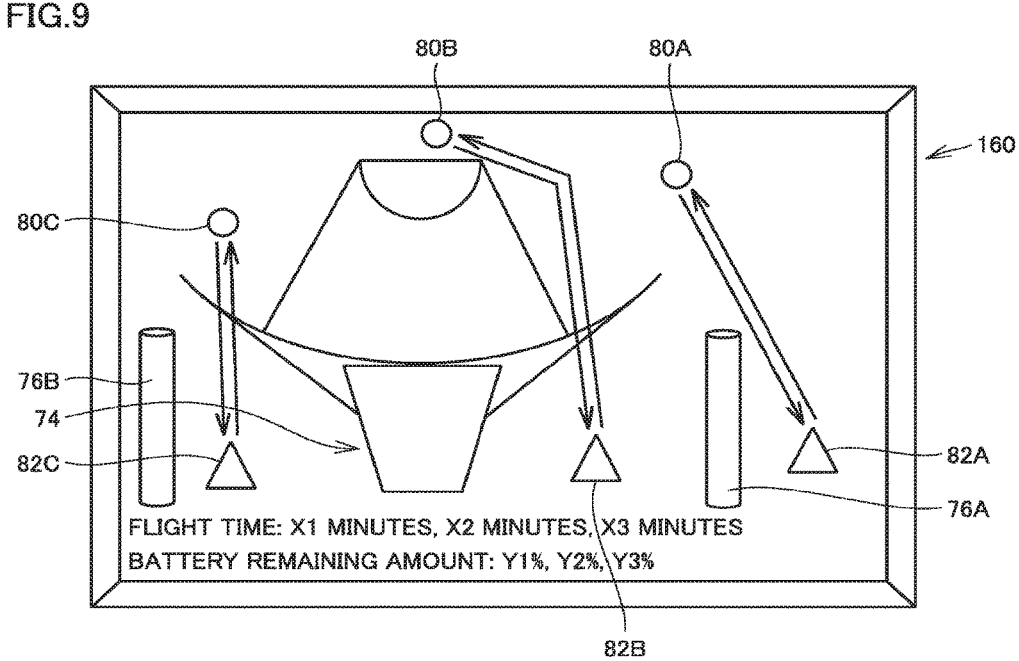
FIG. 9 illustrates a state in checking the flight route using a route simulator in the second embodiment.

FIG. 9 illustrates a state in checking the flight route using the route simulator in the second embodiment. Display 160 presents a flight route of air vehicle 102A flying from flight start point 82A, reaching image capturing point 80A, and returning to flight start point 82A. Likewise, display 160 presents a flight route of air vehicle 102B flying from flight start point 82B, reaching image capturing point 80B, and returning to flight start point 82B. Likewise, display 160 presents a flight route of air vehicle 102C flying from flight start point 82C, reaching image capturing point 80C, and returning to flight start point 82C.

Before the flight, the operator can check whether or not there is a possibility that air vehicles 102A to 102C on the flight routes will meet the structure.

Moreover, as with the first embodiment, simulator 58 calculates respective flight times (X1, X2, X3 (minutes)) and respective remaining amounts (Y1, Y2, Y3 (%)) of batteries 28 after the flights of air vehicles 102A to 102C, and presents them at the lower left portion of display 60. Accordingly, it is possible to avoid the measurement from being aborted due to the batteries being run out by capturing too many images or by the flight distance being too long, for example.

Figure 10:
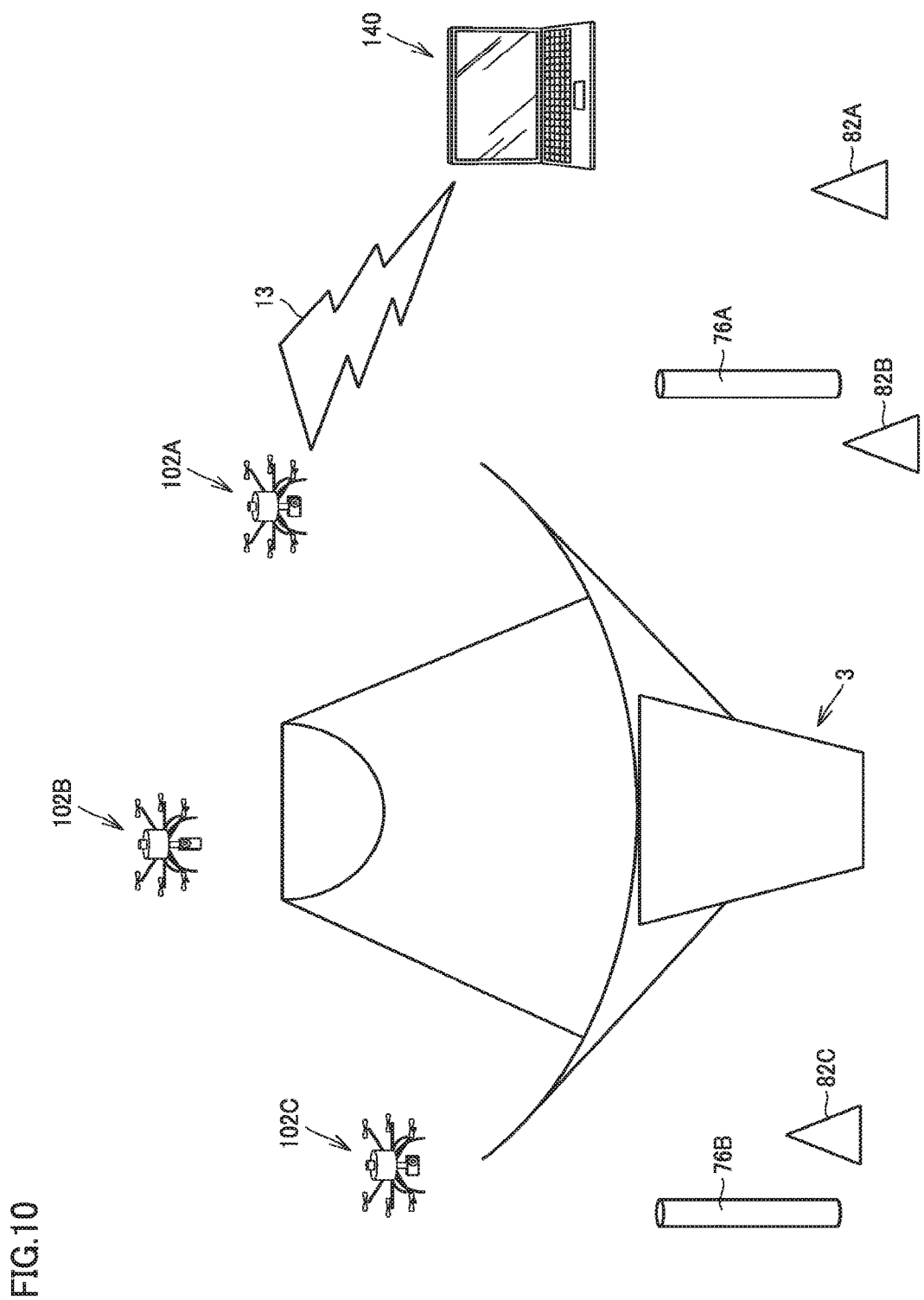
FIG. 10 shows a manner of performing the image capturing for the shape measurement using a plurality of air vehicles in the second embodiment.

FIG. 10 shows a manner of performing the image capturing for the shape measurement using the plurality of air vehicles in the second embodiment. Air vehicles 102A to 102C are respectively set at flight start points 82A to 82C near target structure 3, and then start to fly and capture images. It should be noted that in order to avoid the figure from being complicated, one image capturing point is shown for each of air vehicles 102A to 102C in FIG. 8 and FIG. 9; however, a plurality of image capturing points may be set for each of air vehicles 102A to 102C. Air vehicles 102A to 102C sequentially fly to respective image capturing points assigned thereto so as to perform required image capturing, and then respectively return to flight start points 82A to 82C.

At each of the image capturing points, an image of structure 3 in an operating state together with a plurality of references (reference objects 76A, 76B) is captured. By capturing the image of the target structure together with the references, a plurality of captured images can be compared, thus readily securing precision. Precisely, the operating state herein means a state in which the structure is unmoved with the structure being inclined at an angle at which the structure is used. As required, the operator inputs operating state information, which is information indicating what state the operating state is, such as the angle at which the structure is used. The control device of the target may be connected to remote control device 140 to automatically obtain the operating state information.

Moreover, since the plurality of air vehicles 102A to 102C are used, the flights and image capturing are completed in a short time, thereby reducing influence of a change in external environment. This leads to measurement with higher precision.

For example, since influence of a temperature change is large during daytime, a change in shape of the structure is likely to occur due to linear expansion of the structure or the like during the flight and image capturing time. Therefore, conventionally, flight and image capturing have been often performed during night time during which a temperature change is relatively small.

In the image capturing system for the shape measurement of the structure in the second embodiment, the measurement time is reduced by using the plurality of air vehicles simultaneously. Hence, the temperature change during the image capturing time can be smaller than that in the case where the flight and image capturing are performed using one air vehicle. This leads to improved precision in measurement during daytime.

It should be noted that in the case where the flight and image capturing are performed in daytime, a vision sensor, a laser sensor, or a geomagnetic sensor may be employed as the sensor applied to the obstacle detector. Accordingly, autonomous flight and image capturing in daytime can be performed.

Moreover, it is considered that in order to inspect an influence of strong wind or the like over an antenna, the shape of the antenna actually in use after installation thereof may be measured.

Figure 11:
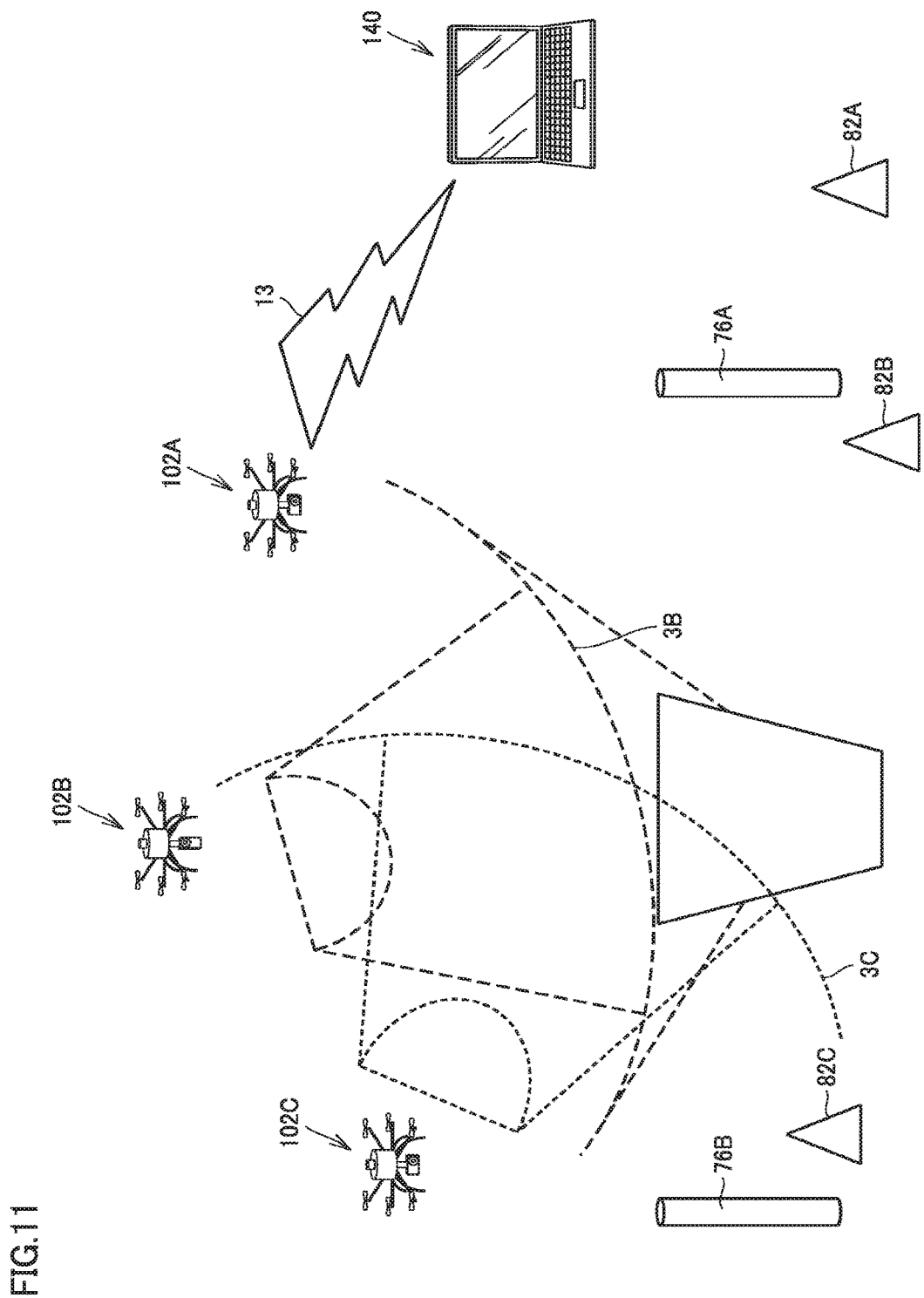
FIG. 11 illustrates a manner of performing the image capturing for shape measurement in operating states.

FIG. 11 illustrates a manner of measurement in operating states. Precisely, the operating states herein mean states 3B, 3C of the antenna in each of which the antenna is unmoved with the antenna being inclined at an angle at which the antenna is used. By capturing images of the antenna in the plurality of operating states together with the same reference objects by changing the operating states, a change in shape thereof due to gravity or the like can be checked.

Two or more air vehicles 102A to 102C are used to capture images of the target structure in operating states 3B, 3C together with the plurality of references (reference objects 76A, 76B). Three or more operating states may be employed.

By software processing such as image processing, the shape of the antenna in each of unmoved states 3B, 3C can be measured in accordance with a positional relation between each reference and the measurement point of the target structure. By comparing the measured shape with the original 3D data (CAD data or the like), the change in shape and precision of the target structure in each of the operating states can be measured.

According to the measurement system of the second embodiment, by performing image capturing using the photogrammetry cameras mounted on the plurality of air vehicles, the whole region of the target can be measured, thus securing high measurement precision. Moreover, the shape change state and precision of the target structure in each of the operating states can be measured.

[Modification]

The following describes various modifications that can be implemented in a combination of the above-mentioned first and second embodiments.

Figure 12:
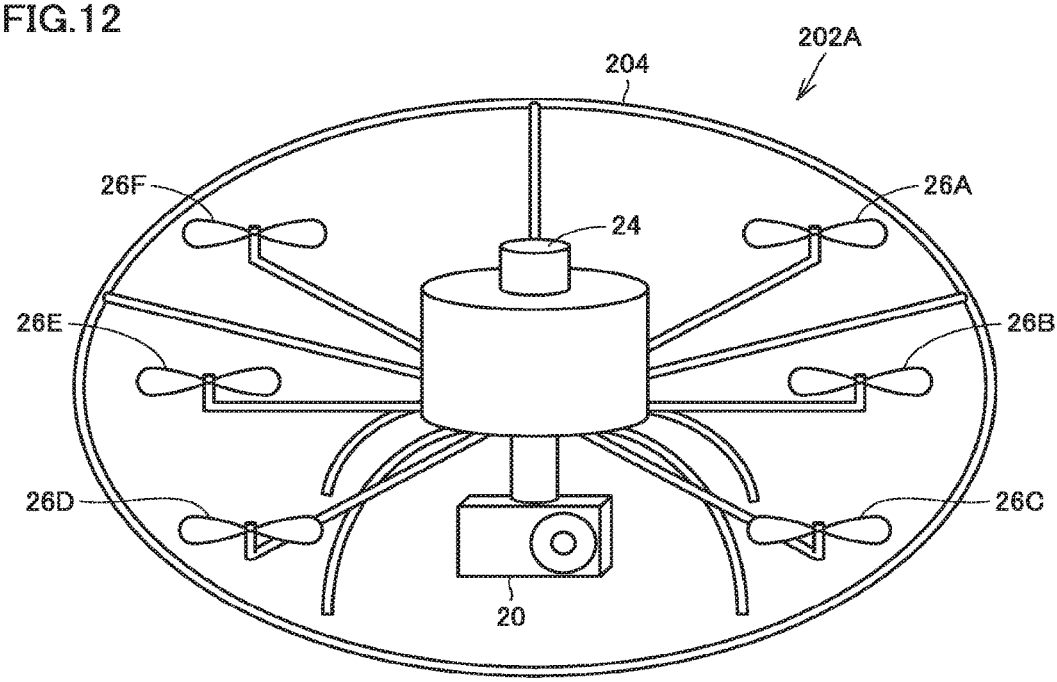
FIG. 12 shows a propeller guard example 1.
Figure 13:
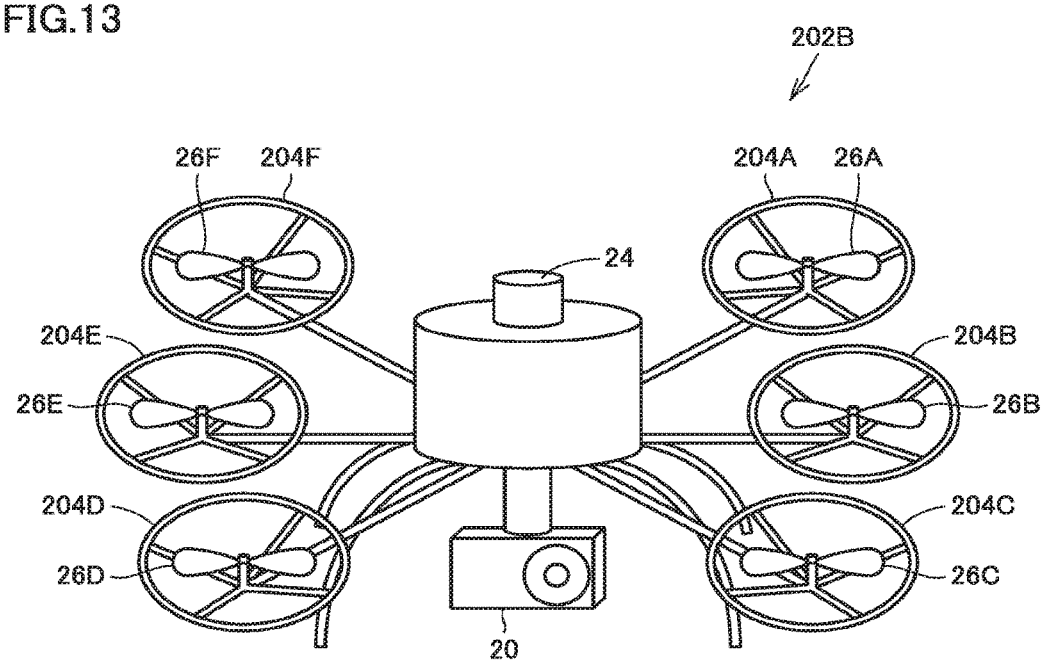
FIG. 13 shows a propeller guard example 2.

FIG. 12 shows a propeller guard example 1. FIG. 13 shows a propeller guard example 2. A propeller guard 204 shown in FIG. 12 is configured to guard the outer circumference of the whole of the plurality of propellers 26A to 26F. Moreover, propeller guards 204A to 204F shown in FIG. 13 are configured to individually guard the plurality of propellers 26A to 26F. By providing such propeller guards, if the air vehicle meets the target structure or obstacle, the structure is not damaged and the propellers can be prevented from being broken and being decreased in controllability.

Moreover, in the flowchart shown in FIG. 3, it has been illustrated that when the flight cannot be continued, the air vehicle is controlled to leave to a safe location or the switching is made to the remote control operation by the operator in step S10; however, instead of or in addition to these, a parachute and/or an air bag may be used.

Figure 14:
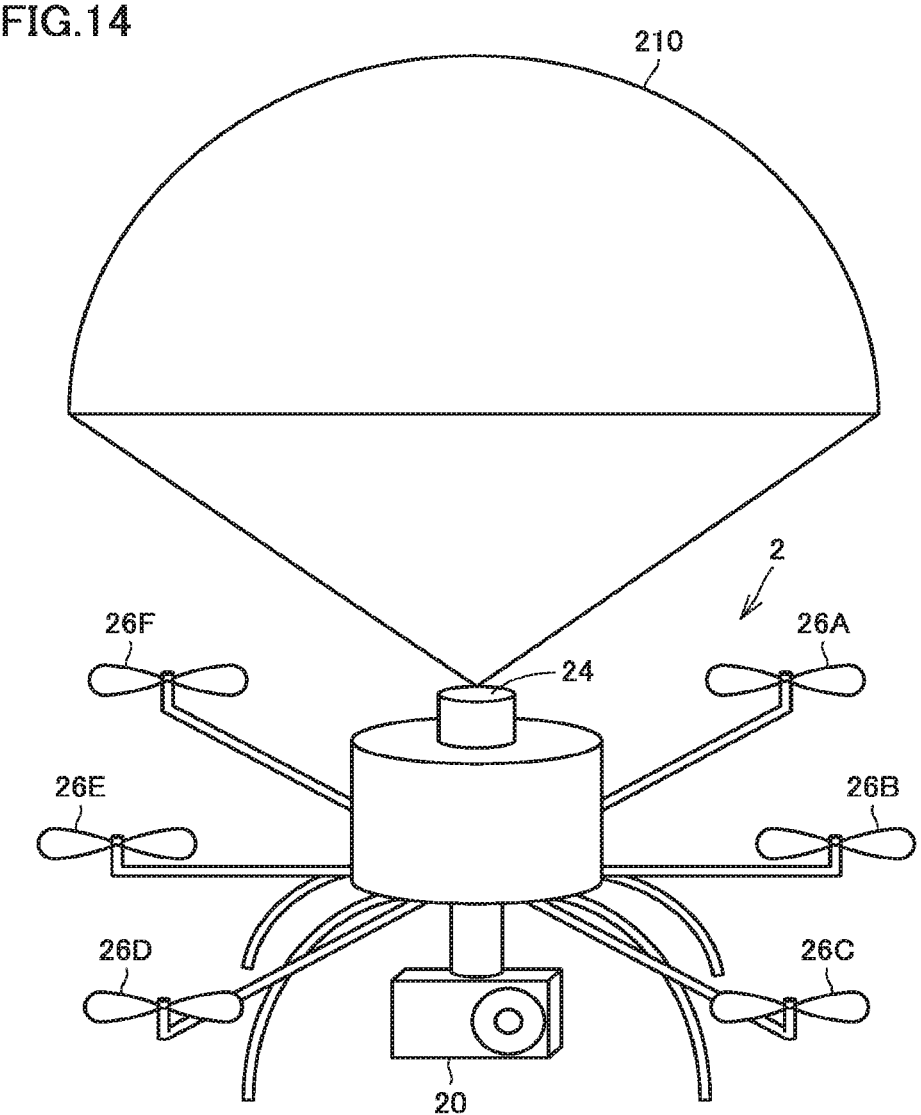
FIG. 14 is a schematic view showing an example in which a parachute is attached to the air vehicle.
Figure 15:
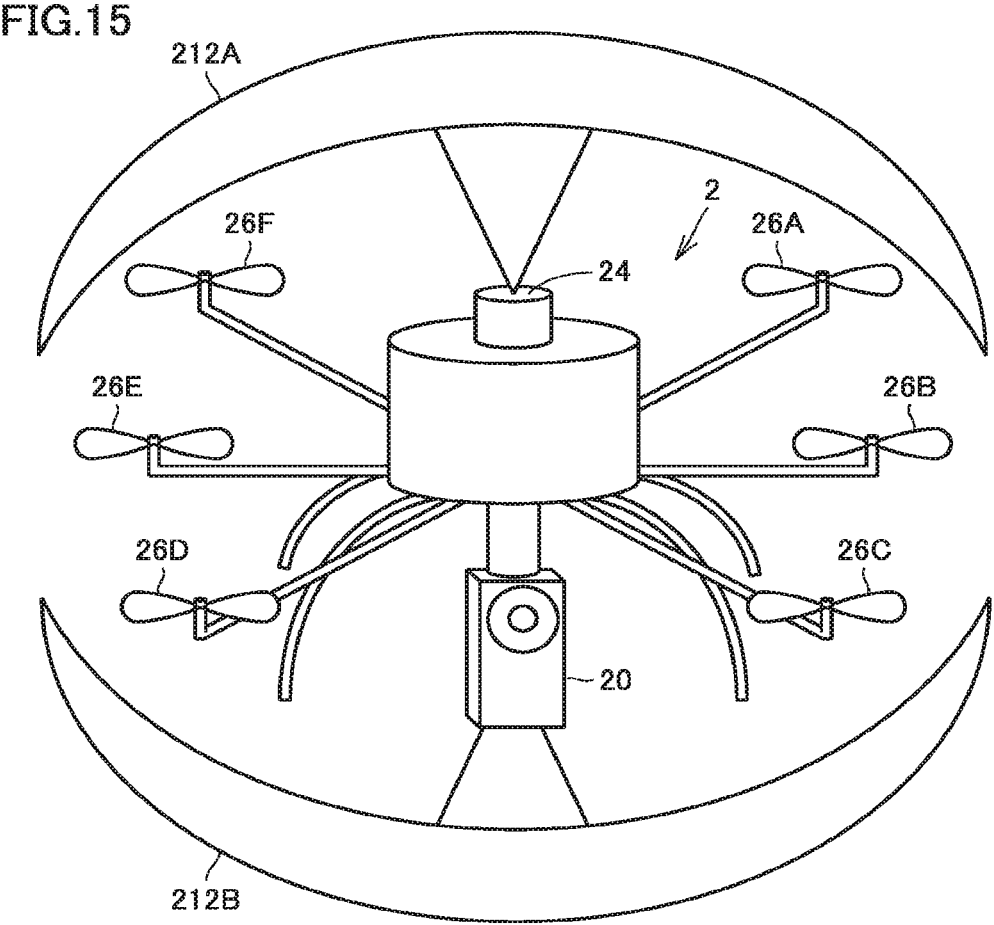
FIG. 15 is a schematic view showing a first example in which air bags are attached to the air vehicle.
Figure 16:
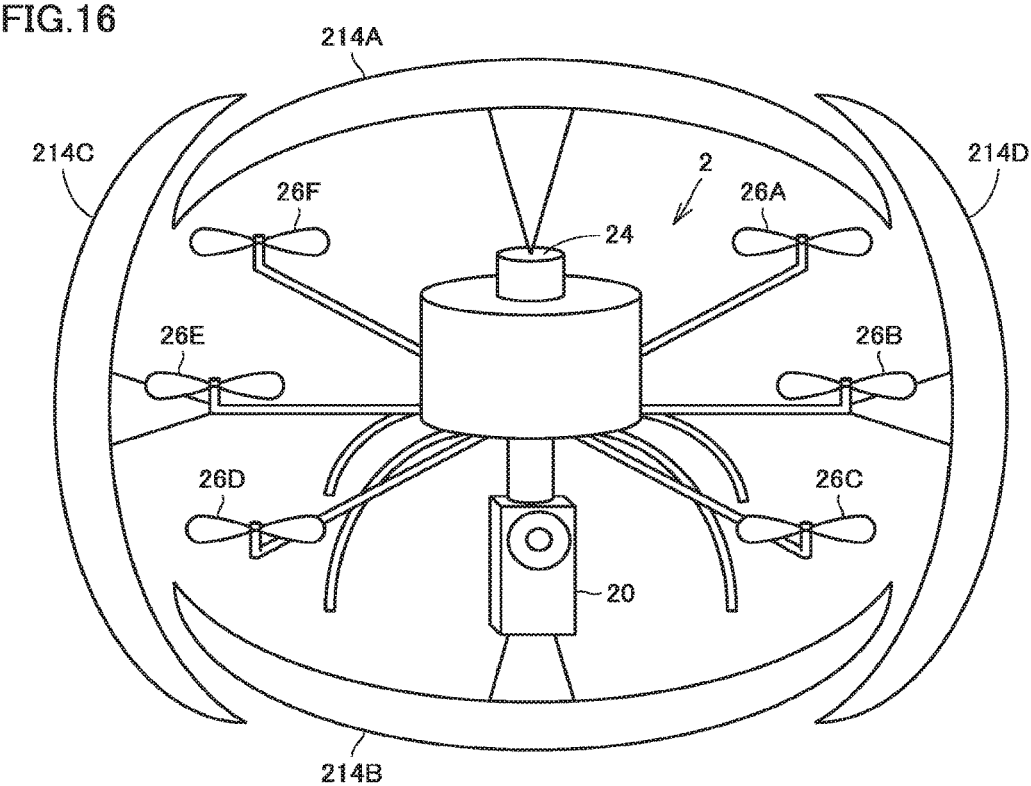
FIG. 16 is a schematic view showing a second example in which air bags are attached to the air vehicle.

FIG. 14 is a schematic view showing an example in which a parachute is attached to the air vehicle. FIG. 15 is a schematic view showing a first example in which air bags are attached to the air vehicle. FIG. 16 is a schematic view showing a second example in which air bags are attached to the air vehicle.

When it is difficult to continue the flight due to an unexpected situation such as a blast of wind or failure of a device during the flight, it is desirable to leave the flight route and attempt to land in a safe manner. The safe manner in this case means landing with a parachute, prevention of damage by an air bag upon collision with the target, or guidance by a manual operation.

For the safe landing, as emergency landing device 30 of FIG. 1, air vehicle 2 includes a parachute 210 configured to reduce a speed of falling of air vehicle 2 in the event of an emergency such as loss of control.

When it is difficult for air vehicle 2 to continue flying during the flight, flight controller 18 is configured to control air vehicle 2 to leave the flight route in the image capturing scenario and land with the parachute. In the event of an emergency such as loss of control, flight controller 18 is configured to open the parachute instantaneously, thereby preventing a crash and attaining safe landing.

As shown in FIG. 15 and FIG. 16, air vehicle 2 has air bags 212A, 212B, 214A to 214D mounted thereon in order to prevent a damage in the target during landing or falling. In this case, emergency landing device 30 of FIG. 1 is each of the air bags that protect air vehicle 2 and the structure from an impact by a collision therebetween.

The air bags are divided into two to be located above and below air vehicle 2 as shown in FIG. 15 or are divided into a plurality of air bags as shown in FIG. 16 to provide a construction covering air vehicle 2 as a whole. Flight controller 18 is configured to operate the air bags instantaneously in the event of loss of control, thereby protecting the target structure and the like.

It should be noted that both the parachute and the air bags may be mounted on air vehicle 2. Flight controller 18 is configured to operate the parachute and the air bags when it becomes difficult for air vehicle 2 to continue flying during the flight and air vehicle 2 cannot be remotely controlled.

Figure 17:
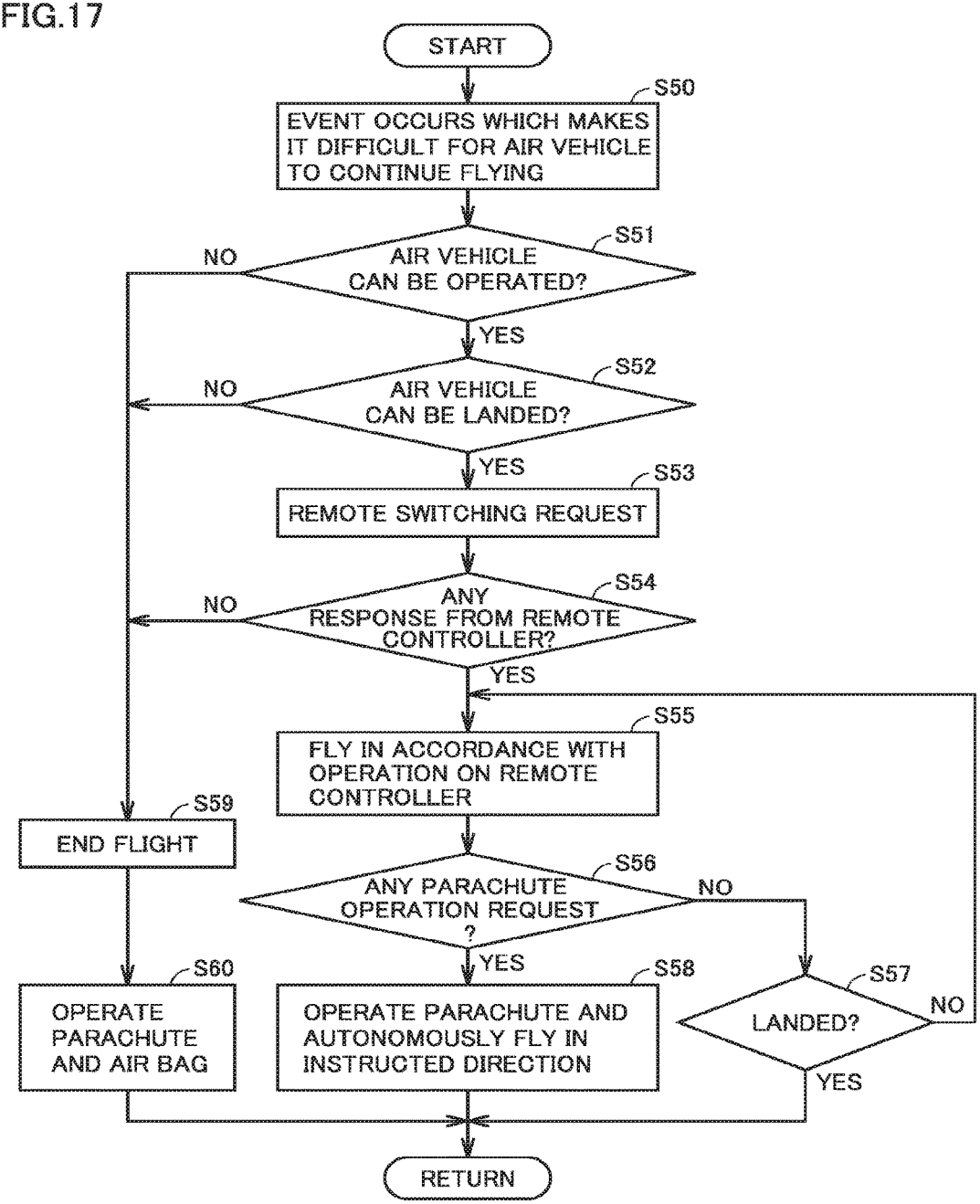
FIG. 17 is a flowchart for illustrating a process in the event of emergency landing of the air vehicle including the parachute and the air bags.

FIG. 17 is a flowchart for illustrating a process in the event of emergency landing of the air vehicle including the parachute and the air bags. In a step S50, in accordance with an output of an acceleration sensor mounted on air vehicle 2, an output of a sensor for measuring an operation condition of flight promoter 26, and the like, flight controller 18 determines that there has occurred an event that makes it difficult for air vehicle 2 to continue flying, such as occurrence of a blast of wind or failure of a device. In a step S51, flight controller 18 determines whether or not air vehicle 2 can be operated. Examples of the case where air vehicle 2 cannot be operated include: a case where the body of the air vehicle is not stabilized in the course of crashing; and the like.

When air vehicle 2 can be operated (YES in S51), the process is brought to a step S52. In step S52, it is determined whether or not air vehicle 2 can land. Examples of the case where air vehicle 2 can land include: a case where there is a battery remaining amount sufficient to move in a distance to a landing point; and the like.

When air vehicle 2 can land (YES in S52), the process is brought to a step S53. In step S53, flight controller 18 outputs, to display 60 of remote control device 40 or emergency remote controller 6, a request for switching to the remote operation employing emergency remote controller 6.

Next, in a step S54, flight controller 18 determines whether or not there is a response indicating a result of operating remote controller 6 by the operator having noticed the presentation. While waiting for the response from the remote controller, air vehicle 2 is unmoved in air at the location.

When there is a response from the remote controller (YES in S54), the control is switched in step S55 from the autonomous flight control to the flight control that is in accordance with the operation on the remote controller, whereby air vehicle 2 flies in accordance with the operation on the remote controller by the operator. In the flight in accordance with the operation on the remote controller, in a step S56, it is determined at a determined time interval whether or not there is a parachute operation request from the remote controller. The parachute operation request is an instruction for operating the parachute.

When there is no parachute operation request (NO in S56), it is checked in a step S57 whether or not the air vehicle has landed. When the air vehicle has not landed (NO in S57), the process is returned to step S55. When the air vehicle has landed (YES in S57), the process is ended.

On the other hand, when there is the parachute operation request (YES in S56), the process is brought to step S57, and flight controller 18 operates the parachute and reverts the control to the autonomous flying control so as to land after moving in the flight direction in which the air vehicle flies as instructed by the operation of the operator before receiving the parachute operation request.

In one of the case where the air vehicle cannot be operated (NO in S51), the case were the air vehicle cannot land (NO in S52), and the case where there is no response from the remote controller after passage of a determined time (NO in S54), the process is brought to a step S59. Flight controller 18 ends the flight of the air vehicle in step S59, and operates the parachute and air bags in a step S60. Even if air vehicle 2 is inevitably crashed, air vehicle 2 and the structure are protected.

Figure 18:
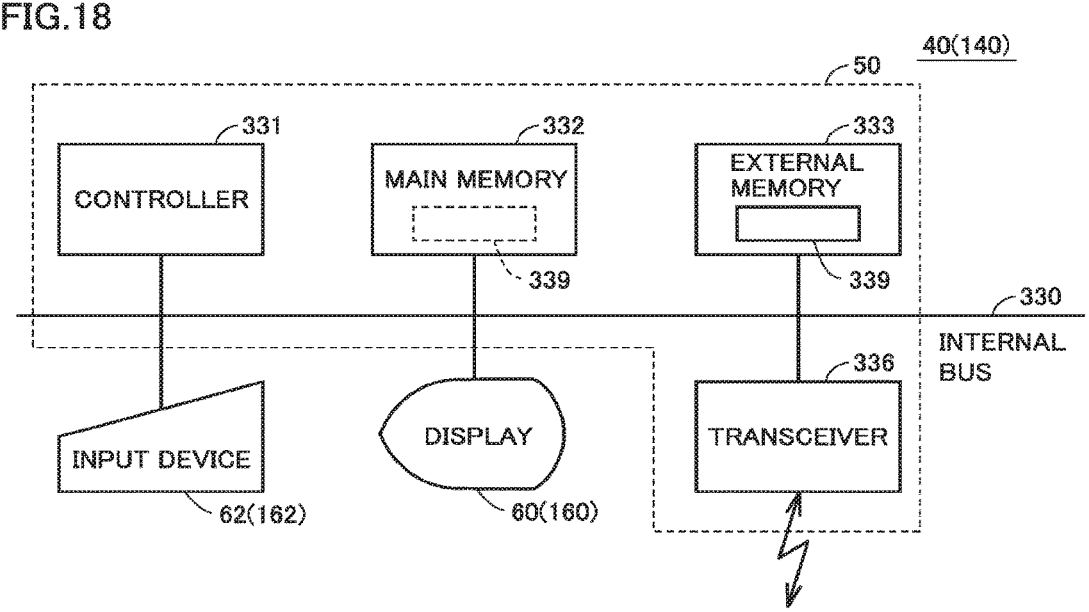
FIG. 18 is a block diagram showing an exemplary hardware configuration of each of remote control device 40 according to the first and second embodiments and remote control device 140 according to the second embodiment.

FIG. 18 is a block diagram showing an exemplary hardware configuration of each of remote control device 40 according to the first embodiment and remote control device 140 according to the second embodiment. Remote control device 40 includes main processor 50, display 60, and input device 62. Remote control device 140 includes main processor 50, display 160, and input device 162. Main processor 50 includes a controller 331, a main memory 332, an external memory 333, and a transceiver 336. Each of main memory 332, external memory 333, input device 334, display 335, and transceiver 336 is connected to controller 331 via an internal bus 330.

Controller 331 is constituted of a CPU (Central Processing Unit) or the like, and performs the processes of steps S1 to S4 shown in FIG. 3 in accordance with a control program 339 stored in external memory 333.

Main memory 332 is constituted of a RAM (Random-Access Memory) or the like, control program 339 stored in external memory 333 is loaded thereto, and main memory 332 is used as a workspace of controller 331.

External memory 333 is constituted of a nonvolatile memory such as a flash memory, a hard disk, a DVD-RAM (Digital Versatile Disc Random-Access Memory), or a DVD-RW (Digital Versatile Disc ReWritable). External memory 333 beforehand stores a program for causing controller 331 to perform the process of main processor 50. Moreover, in accordance with an instruction from controller 331, this program supplies stored data to controller 331, and stores data supplied from controller 331.

Each of input device 62 and input device 162 is constituted of a keyboard, a pointing device, and an interface device. Examples of the pointing device include a mouse and the like. The interface device is configured to connect the keyboard, the pointing device, and the like to internal bus 330. When the user sets a flight route, information entered via input device 62 in remote control device 40 is supplied to controller 331, and information entered via input device 162 in remote control device 140 is supplied to controller 331.

Display 335 is constituted of a CRT (Cathode Ray Tube), a LCD (Liquid Crystal Display), or the like. When the user sets a flight route to main processor 50, the screen shown in FIG. 4 or the like is presented thereon.

When controller 331 executes the program stored in external memory 333, controller 331 and transceiver 336 function as image capturing data receiver 52, scenario transferer 54, scenario creator 56, and simulator 58 in FIG. 1.

Moreover, the processes of steps S1 to S4 shown in FIG. 3 are performed by control program 339 performing a process using controller 331, main memory 332, external memory 333, input device 62 (or input device 162), display 60 (or display 160), transceiver 336, and the like as hardware resources.

Figure 19:
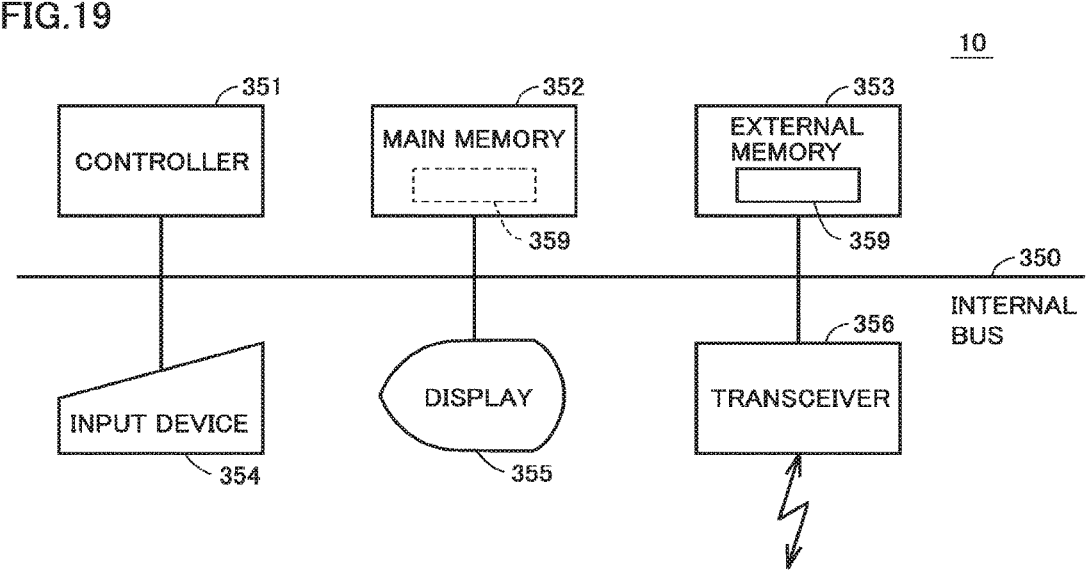
FIG. 19 is a block diagram showing an exemplary hardware configuration of each of on-board control devices 10 according to the first and second embodiments.

FIG. 19 is a block diagram showing an exemplary hardware configuration of each of on-board control devices 10 according to the first and second embodiments. On-board control device 10 includes a controller 351, a main memory 352, an external memory 353, an input device 354, a display 355, and a transceiver 356. Each of main memory 352, external memory 353, input device 354, display 355, and transceiver 356 is connected to controller 351 via an internal bus 350.

Controller 351 is constituted of a CPU or the like, and performs the processes of steps S5 to S10 shown in FIG. 3 in accordance with a control program 359 stored in external memory 353.

Main memory 352 is constituted of a RAM or the like, control program 359 stored in external memory 353 is loaded thereto, and main memory 352 is used as a workspace of controller 351.

External memory 353 is constituted of a nonvolatile memory such as a flash memory or a hard disk. External memory 353 beforehand stores a program for causing controller 351 to perform a process of on-board control device 10. Moreover, in accordance with an instruction from controller 351, this program supplies stored data to controller 351, and stores data supplied from controller 351. Image capturing data storage 12 and image capturing scenario storage 14 of on-board control device 10 are implemented in external memory 353.

Input device 354 is constituted of an interface device that connects an operation button or the like to internal bus 350. When the user inputs a command such as forced termination or rebooting to the on-board control device, information entered via input device 354 is supplied to controller 351.

Display 355 is constituted of an LED, an LCD, or the like. When the user inputs a command such as forced termination or rebooting to on-board control device 10, display 355 presents the state of on-board control device 10.

Controller 351 and transceiver 356 function as image capturing controller 16 and flight controller 18 when the program stored in external memory 353 is executed by controller 351.

The processes of steps S5 to S10 shown in FIG. 3 can be performed by control program 359 performing a process using controller 351, main memory 352, external memory 353, input device 354, display 355, transceiver 356, and the like as resources.

In addition, the hardware configurations shown in FIG. 18 and FIG. 19 and the flowchart of FIG. 3 are exemplary and can be changed and modified appropriately.

Each of the hardware configurations shown in FIG. 18 and FIG. 19 can be implemented using an ordinary computer system, rather than a dedicated system. For example, on-board control device 10 and remote control device 40 may be implemented by: storing the computer program for performing the above-mentioned operation in a computer readable storage medium (a flexible disk, a CD-ROM, a DVD-ROM or the like); distributing it; and installing the computer program in a computer. Moreover, on-board control device 10 and remote control device 40 may be implemented by: storing the computer program in a storage device included in a server device on a communication network such as the Internet; and downloading it by an ordinary computer system.

Moreover, when the function of on-board control device 10 or remote control device 40 is implemented by an OS (operating system) and an application program in an allotted manner or is implemented in cooperation with the OS and the application program, only the application program may be stored in the storage medium or the storage device.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims. The embodiments of the present disclosure can be freely combined, modified, or omitted within the scope of the spirit of the present disclosure.

REFERENCE SIGNS LIST

1, 101: image capturing system for shape measurement; 2, 102A, 102B, 102C: air vehicle; 3: structure; 6: emergency remote controller; 9: gimbal; 10: on-board control device; 12: image capturing data storage; 14: image capturing scenario storage; 16: image capturing controller; 18: flight controller; 20: image capturing device; 22: communicator; 24: obstacle detector; 26: flight promoter; 26A to 26F: propeller; 28: battery; 30: emergency landing device; 40, 140: remote control device; 50: main processor; 52: image capturing data receiver; 54: scenario transferer; 56: scenario creator; 58: simulator; 60, 160: display; 62, 162: input device; 72, 82A to 82C: flight start point; 74: structure data image; 76A, 76B: reference object; 204, 204A to 204F: propeller guard; 210: parachute; 212A, 212B, 214A to 214D: air bag; 330, 350: internal bus; 331, 351: controller; 332, 352: main memory; 333, 353: external memory; 336, 356: transceiver; 339, 359: control program.

The invention claimed is:

1. An image capturing system for shape measurement of a structure, the image capturing system comprising:
   an image capturing device configured to capture an image of a target structure to measure a shape of the target structure;
   an air vehicle having the image capturing device mounted thereon, the air vehicle being configured to fly and be unmoved in air;
   a distance measurement device mounted on the air vehicle and configured to measure a distance between the air vehicle and the target structure;
   an image capturing scenario storage configured to store an image capturing scenario, the image capturing scenario including:
   a plurality of image capturing points at each of which the air vehicle is unmoved in air with a distance from the target structure being maintained when capturing the image of the target structure to measure the shape of the target structure with the target structure being unmoved, and
   a flight route set in accordance with a positional relation between the target structure and each of the image capturing points or coordinates of each of the image capturing points such that the air vehicle having the image capturing device mounted thereon and configured to capture the image of the target structure flies via the image capturing points sequentially;
   an on-board control device mounted on the air vehicle, the on-board control device including:
   an image capturing controller configured to control the image capturing device in accordance with the image capturing scenario, and
   a flight controller configured to control the air vehicle in accordance with the image capturing scenario based on the distance measured by the distance measurement device; and
   a remote control device including:
   a scenario creator configured to create the image capturing scenario based on the image capturing points, and
   a scenario transferor configured to transfer the image capturing scenario created by the scenario creator to the on-board control device to store the image capturing scenario in the image capturing scenario storage,
   the scenario creator configured to:
   check whether or not a path connecting a first image capturing point to a second image capturing point in a straight line meets the target structure, the first image capturing point and the second image capturing point being different image capturing points,
   when the path does not meet the structure, create the flight route including the path connecting the first image capturing point to the second image capturing point in the straight line, and
   when the path meets the structure, create the flight route including a path avoiding the target structure in flight between the first image capturing point and the second image capturing point.

2. The image capturing system for the, shape measurement of the structure according to claim 1, wherein
   the remote control device further includes a simulator configured to perform a simulation of the image capturing scenario created by the scenario creator and present a result of the simulation to an operator, and
   the simulator is configured to present to the operator at least one of presence/absence of an obstacle on the flight route, a flight time estimate value, and a battery remaining amount estimate value after the flight of the air vehicle on the flight route.

3. The image capturing system for the shape measurement of the structure according to claim 2, further comprising an obstacle detector mounted on the air vehicle and configured to detect an obstacle around the air vehicle, wherein
   when the obstacle detector detects an obstacle on the flight route during flight, the flight controller is configured to change the flight route to avoid the obstacle to reach the image capturing point.

4. The image capturing system for the shape measurement of the structure according to claim 1, further comprising:

a plurality of the image capturing devices;
a plurality of the air vehicles having the respective image capturing devices mounted thereon;
a plurality of the on-board control devices mounted on the respective air vehicles; and
the remote control device including:
the scenario creator configured to create divided scenarios based on the plurality of image capturing points, the divided scenarios being respective image capturing scenarios for the air vehicles, and
the scenario transferer configured to transfer the divided scenarios to the on-board control devices of the corresponding air vehicles; wherein
each of the plurality of image capturing points is included in the image capturing scenario of any one of the divided scenarios.

5. The image capturing system for the shape measurement of the structure according to claim 4, wherein the plurality of image capturing points include simultaneous image capturing points at which images are determined to be captured simultaneously, and the respective simultaneous image capturing points are included in different divided scenarios.

6. The image capturing system for the shape measurement of the structure according to claim 1, further comprising an obstacle detector mounted on the air vehicle and configured to detect an obstacle around the air vehicle, wherein
when the obstacle detector detects an obstacle on the flight route during flight, the flight controller is configured to change the flight route to avoid the obstacle to reach the image capturing point.

7. A remote control device comprising:
a scenario creator configured to create an image capturing scenario, the image capturing scenario including:
a plurality of image capturing points at each of which an air vehicle is unmoved in air with a distance from a target structure being Maintained When capturing an image of the target structure to measure the shape of the target structure with the target structure being unmoved, the air vehicle having an image capturing device mounted thereon to measure the shape of the target structure, the image capturing device configured to capture the image of the target structure, the air vehicle being configured to fly and be unmoved in air, the air vehicle further having a distance measurement device amounted thereon and configured to measure a distance between the air vehicle and the target structure, the distance from the target structure being maintained based on the measured distance, and
a flight route set in accordance with a positional relation between the target structure and each of the image capturing points or coordinates of each of the image capturing points such that the air vehicle having the image capturing device mounted thereon and configured to capture the image of the target structure flies via the image capturing points sequentially; and
a scenario transferer configured to transfer the image capturing scenario created by the scenario creator to the air vehicle,
the scenario creator being configured to:
check whether or not a path connecting a first image capturing point to a second image capturing point in a straight line meets the target structure, the first image capturing point and the second image capturing point being different image capturing points,
when the path does not meet the structure, create the flight route including the path connecting the first image capturing point to the second image capturing point in the straight line, and
when the path meets the target structure, create the flight route including a path avoiding the target structure in flight between the first image capturing point and the second image capturing point.

8. An on-board control device comprising:
an image capturing scenario storage configured to store the image capturing scenario transferred from the scenario transferer of the remote control device recited in claim 7;
an image capturing controller configured to control the image capturing device in accordance with the image capturing scenario; and
a flight controller configured to control the air vehicle in accordance with the image capturing scenario,
the on-board control device being mounted on the air vehicle.

9. A non-transitory computer readable storage medium storing a program to be executed by a processor of a remote control device,
the program being configured to cause the processor of the remote control device to perform:
creating an image capturing scenario, the image capturing scenario including:
a plurality of image capturing points at each of which an air vehicle is unmoved in air with a distance from a target structure being maintained when capturing an image of the target structure to measure the shape of the target structure with the target structure being unmoved, the air vehicle having an image capturing device mounted thereon to measure the shape of the target structure, the image capturing device configured to capture the image of the target structure, the air vehicle being configured to fly and be unmoved in air, the air vehicle further having a distance measurement device mounted thereon and configured to measure a distance between the air vehicle and the target structure, the distance from the target structure being maintained based on the measured distance, and
a flight route set in accordance with a positional relation between the target structure and each of the image capturing points or coordinates of each of the image capturing points such that the air vehicle having the image capturing device mounted thereon and configured to capture the image of the target structure flies via the image capturing points sequentially; and
transferring the image capturing scenario to an on-board control device mounted on the air vehicle, the air vehicle having the image capturing device mounted thereon, the air vehicle being configured to fly and be unmoved in air,
the creating of the image capturing scenario including:
checking whether or not a path connecting a first image capturing point to a second image capturing point in a straight line meets the target structure, the first image capturing point and the second image capturing point being different image capturing points,
when the path does not meet the structure, creating the flight route including the path connecting the first image capturing point to the second image capturing point in the straight line, and when the path meets the target structure, creating the flight route including a path avoiding the target structure in flight between the first image capturing point and the second image capturing point.

\* \* \* \* \*